United States Patent [19]
Kowalski et al.

[11] Patent Number: 6,120,034
[45] Date of Patent: Sep. 19, 2000

[54] SECONDARY SEALING ASSEMBLY FOR MECHANICAL FACE SEAL

[75] Inventors: Christopher A. Kowalski, East Hampstead, N.H.; Shifeng Wu, Newburyport, Mass.; Henri V. Azibert, Windham, N.H.

[73] Assignee: A.W. Chesterston Company, Stoneham, Mass.

[21] Appl. No.: 09/013,635

[22] Filed: Jan. 26, 1998

Related U.S. Application Data

[63] Continuation-in-part of application No. 09/005,957, Jan. 9, 1998, abandoned, which is a continuation-in-part of application No. 08/992,753, Dec. 17, 1997, which is a continuation-in-part of application No. 08/992,751, Dec. 17, 1997, which is a continuation-in-part of application No. 08/992,611, Dec. 17, 1997, which is a continuation-in-part of application No. 08/992,613, Dec. 17, 1997.

[51] Int. Cl.[7] .................................................. F16J 15/34
[52] U.S. Cl. ........................... 277/377; 277/396; 277/397
[58] Field of Search ..................................... 277/377, 390, 277/396, 397, 344

[56] References Cited

U.S. PATENT DOCUMENTS

| | | |
|---|---|---|
| 2,928,685 | 3/1960 | Tracy .................................... 286/11.14 |
| 3,486,760 | 12/1969 | Tracy . |
| 3,498,620 | 3/1970 | Wiese . |
| 3,526,408 | 9/1970 | Tracy . |
| 3,589,738 | 6/1971 | Tracy . |
| 3,917,289 | 11/1975 | Ivanov et al. . |
| 3,948,530 | 4/1976 | Gyory . |
| 4,196,911 | 4/1980 | Matsushita . |
| 4,212,475 | 7/1980 | Sedy . |
| 4,438,936 | 3/1984 | Schlegel . |
| 4,447,063 | 5/1984 | Kotzur et al. . |
| 4,576,384 | 3/1986 | Azibert . |
| 4,749,199 | 6/1988 | Gresh . |
| 5,039,113 | 8/1991 | Gardner .................................... 277/379 |
| 5,052,694 | 10/1991 | Lipschitz . |
| 5,114,163 | 5/1992 | Radosav et al. . |
| 5,143,384 | 9/1992 | Lipschitz . |
| 5,199,720 | 4/1993 | Radosav et al. . |
| 5,333,882 | 8/1994 | Azibert et al. . |
| 5,370,401 | 12/1994 | Sandgren . |
| 5,370,403 | 12/1994 | Sedy . |
| 5,451,065 | 9/1995 | Holder . |
| 5,560,622 | 10/1996 | Sedy . |
| 5,725,220 | 3/1998 | Clark et al. . |
| 5,762,342 | 6/1998 | Kakabaker et al. . |
| 5,769,427 | 6/1998 | Ostrowski . |
| 5,820,129 | 10/1998 | Reagan . |

FOREIGN PATENT DOCUMENTS 0 658 714 A1   6/1995   WIPO .

*Primary Examiner*—Anthony Knight
*Assistant Examiner*—Alison K. Pickard
*Attorney, Agent, or Firm*—Lahive & Cockfield, LLP

[57] ABSTRACT

A mechanical seal for providing fluid sealing between a housing and a rotatable shaft includes a gland assembly, a secondary sealing assembly, and first and second seal rings each having a seal face. The secondary sealing assembly provides fluid sealing between the seal rings and the gland assembly. The secondary sealing assembly includes a compression member having a front surface and a rear surface, a resilient member positioned between the rear surface of the compression member and the inner surface of the gland assembly for axially biasing said compression plate, and a sealing member interposed between the front surface of the compression member and the rear surface of the first seal ring. Either the rear surface of the first seal ring or the front surface of the compression member is configured to impart an axial and a radial sealing force on said sealing member to place the sealing member into sealing engagement with the first seal ring and the inner surface of the gland assembly.

23 Claims, 20 Drawing Sheets

SECONDARY SEALING ASSEMBLY FOR MECHANICAL FACE SEAL

REFERENCE TO RELATED APPLICATIONS

This application is a continuation in part of U.S. patent application Ser. No. 09/005,957, filed on Jan. 9, 1998, and entitled "Dual Non-Contacting Mechanical Face Seal Having Concentric Seal Faces" now abandoned, which is a continuation in part of co-pending U.S. patent application Ser. No. 08/992,753, filed on Dec. 17, 1997, and entitled "Split Mechanical Face Seal"; co-pending U.S. patent application Ser. No. 08/992,751, filed on Dec. 17, 1997, and entitled "Split Mechanical Face Seal with Negative Pressure Control System"; co-pending U.S. patent application Ser. No. 08/992,611, filed on Dec. 17 1997, and entitled "Split Mechanical Face Seal With Fluid Introducing Structure"; and co-pending U.S. patent application Ser. No. 08/992,613, filed on Dec. 17, 1997, and entitled "Split Mechanical Face Seal With Resilient Pivoting Member". Each of the above-referenced patent applications is incorporated herein by reference.

BACKGROUND OF THE INVENTION

The present invention relates generally to seals for providing fluid sealing between a housing and a rotating shaft. More particularly, the invention relates to mechanical face seals in which a fluid is introduced between portions of the seal faces of the seal.

Conventional mechanical seals are employed in a wide variety of mechanical apparatuses to provide a pressure-tight and a fluid-tight seal between a rotating shaft and a stationary housing. The seal is usually positioned about the rotating shaft, which is mounted in and protrudes from the stationary housing. The seal is typically bolted to the housing at the shaft exit, thus preventing loss of pressurized process fluid from the housing. Conventional mechanical seals include face type mechanical seals, which include a pair of annular sealing rings that are concentrically disposed about the shaft, and axially spaced from each other. The sealing rings each have seal faces that are biased into physical contact with each other. Usually, one seal ring remains stationary, while the other ring contacts the shaft and rotates therewith. The mechanical seal prevents leakage of the pressurized process fluid to the external environment by biasing the seal ring sealing faces into physical contact with each other. As a result of the repeated physical contact between the faces, abrasion of the seal faces occurs and the seals typically exhibit undesirable wear characteristics and leakage.

The prior art attempted to overcome the above difficulties by employing non-contact mechanical seals that utilize a fluid interposed between the seal ring faces to reduce frictional wear. Conventional mechanical non-contact face seals typically employ pumping grooves, such as spiral or Raleigh step grooves, formed in one of the seal faces of the seal rings to develop a hydrodynamic lifting force that separates the seal faces. The resultant gap allows fluid to be disposed between the seal faces to prevent rubbing and abrasion of the seal faces.

Conventional non-contacting face seals, however, exhibit drawbacks in some areas of performance that are less than optimal. For example, in non-contacting seal designs, which rely primarily upon rotation to provide hydrodynamic separation of the seal faces, a substantial amount of seal face abrasion can occur during start-up operation or during periods when the shaft is rotating at low speeds. For this reason, these conventional non-contacting type mechanical face seals are unsuitable for low speed operation or for conditions which require frequent starting and stopping of the shaft.

As discussed above, during operation of non-contacting mechanical seals, separation of the seal faces occur to form a gap through which sealed fluid passes. Since passage of the sealed fluid is unavoidable, it is generally desirable in prior art systems to limit the amount of leakage across the seal faces. In order to limit the leakage, the stationary seal ring closely tracks the movement of the rotary seal ring to a large degree. The manipulation of the seal faces and thus of the gap width assists in minimizing fluid leakage.

Prior art mechanical seals typically employ a secondary sealing assembly mounted at the rear of the stationary seal to help bias the stationary seal ring face towards the rotary seal face. The secondary sealing assembly comprises a spring, a spacer and an O-ring. The O-ring is generally mounted between the spacer plate, the stationary seal ring and the fluid housing. The area in which the sealing O-ring is typically mounted undesirably compresses the O-ring in the axial and radial direction, thus significantly increasing the frictional engagement of the seal ring with the fluid housing or other component. The spring and plate generate an axial biasing force that biases the stationary seal ring towards the rotary seal ring to enable the rings to move relative to each other.

A drawback of these secondary seals is the inability of the stationary seal ring to track closely the rotary seal ring because of a phenomena called seal face "hang-up." This typically occurs when either through expansion, contraction or other typical seal ring movement generated during operation, the rotor becomes considerably spaced from the stationary seal ring. The frictional engagement of the secondary seal O-ring prevents the seal ring from tracking the rotary seal ring, and thus from closing this gap. This problem is exacerbated when the mechanical seal is shut-down, and the rotor axially creeps away from the stator. When the seal is subsequently started, the seal face separation results in excessive seal leakage. In some cases, the mechanical seal may resist attempts from the seal rings to create the proper seal. Replacement of the seal components is then necessary.

As the above described and other prior art seals have proven less than optimal, an object of the present invention is to provide an improved non-contacting mechanical face seal that is operable under a wider range of operating conditions.

An object of the present invention is to provide a secondary sealing assembly that has relatively low frictional engagement with seal components to enable the seal rings to maintain a proper gap during use.

Other general and more specific objects of this invention will in part be obvious and will in part be evident from the drawings and the description which follow.

SUMMARY OF THE INVENTION

These and other objects of the present invention are attained by the secondary sealing assembly of the present invention for use with a mechanical face seal having a first seal ring, a second seal ring, and a gland assembly. The secondary seal assembly includes a compression member having a front surface and a rear surface, a resilient member positioned between the rear surface of the compression member and the inner surface of the gland assembly for axially biasing the compression plate, and a sealing member interposed between the front surface of the compression member and the rear surface of the first seal ring. The front surface of the compression member is configured to impart an axial and a radial sealing force on the sealing member. The axially and radial sealing force places the sealing member into sealing engagement with the first seal ring and the inner surface of the gland assembly to prevent fluid leakage between the first seal ring and the gland assembly.

The front surface of the compression member can optionally include a first surface and a second surface, the first surface being oriented at angle to the second surface. In a preferred embodiment, the angle between the first surface and the second surface comprises an obtuse angle and, thus, the second surface imparts a radial and an axial force on the sealing member. It is also preferable for the angle defined by the first and second surfaces to be selected to minimize the radial force imparted on the sealing member while concomitantly maintaining the sealing member in sealing contact with the inner surface of the gland assembly. In this manner, the frictional forces between the sealing member and the seal components, i.e., the first seal ring and the gland assembly, is minimized, while still maintaining a fluid seal between the first seal ring and the gland assembly. By minimizing the frictional forces, "hang-up" of the first seal ring by the sealing member is inhibited.

In a preferred embodiment, the rear surface of the first seal ring and the front surface of the compression member form a chamber for receiving the sealing member. The chamber and the secondary sealing assembly are sized to permit thermal expansion of the sealing member in the radial direction during operation of the seal. In this manner, undesirable compression of the sealing member within the chamber, which can result increased frictional forces between the sealing member and first seal ring, is inhibited.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principals of the invention and, although generally or occasionally not to scale, may show relative dimensions.

DESCRIPTION OF THE ILLUSTRATED EMBODIMENTS

Figure 1:
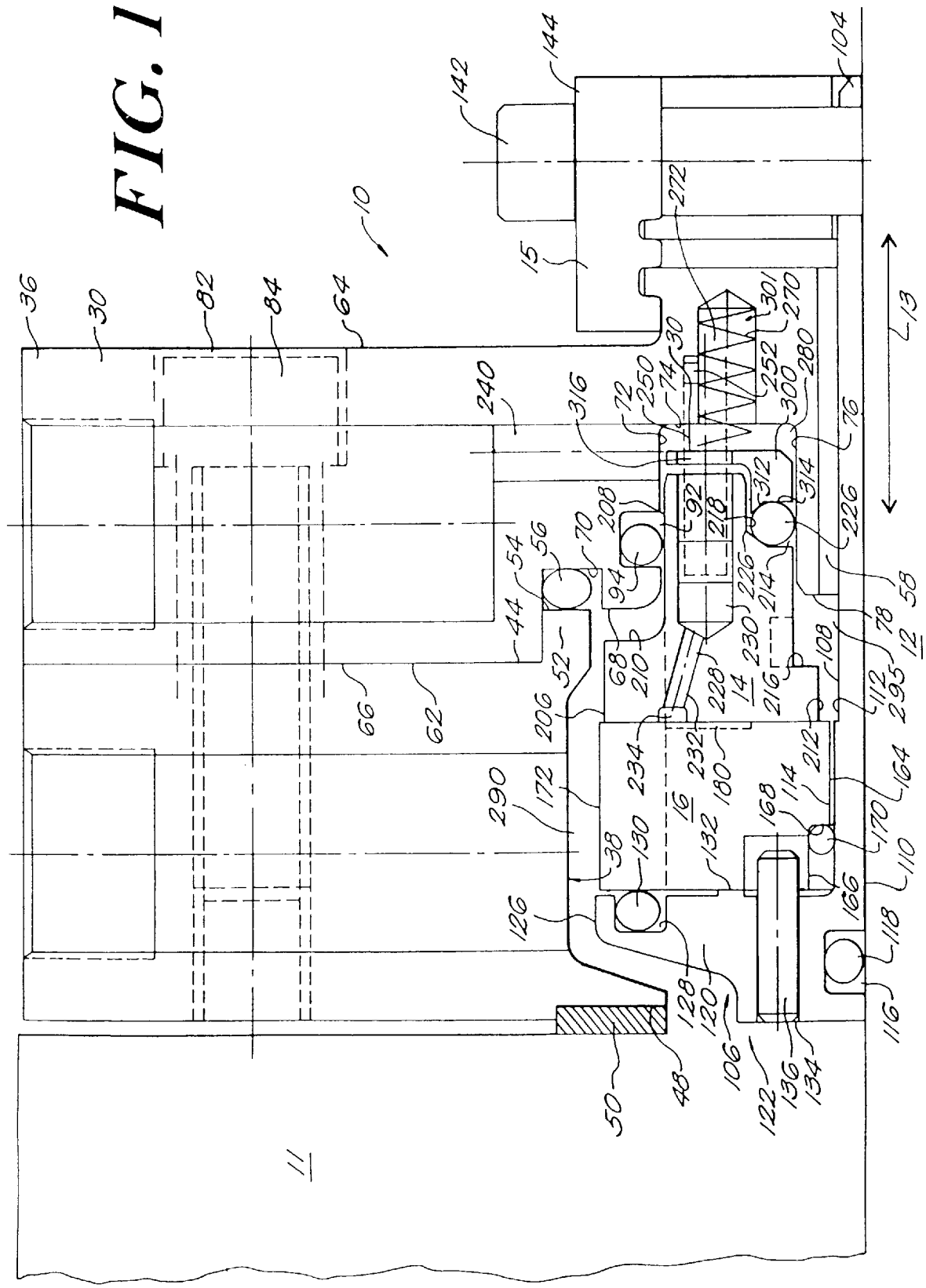
FIG. 1 is a fragmentary view in cross-section of a non-contacting mechanical face seal according to the teachings of the present invention.
Figure 2:
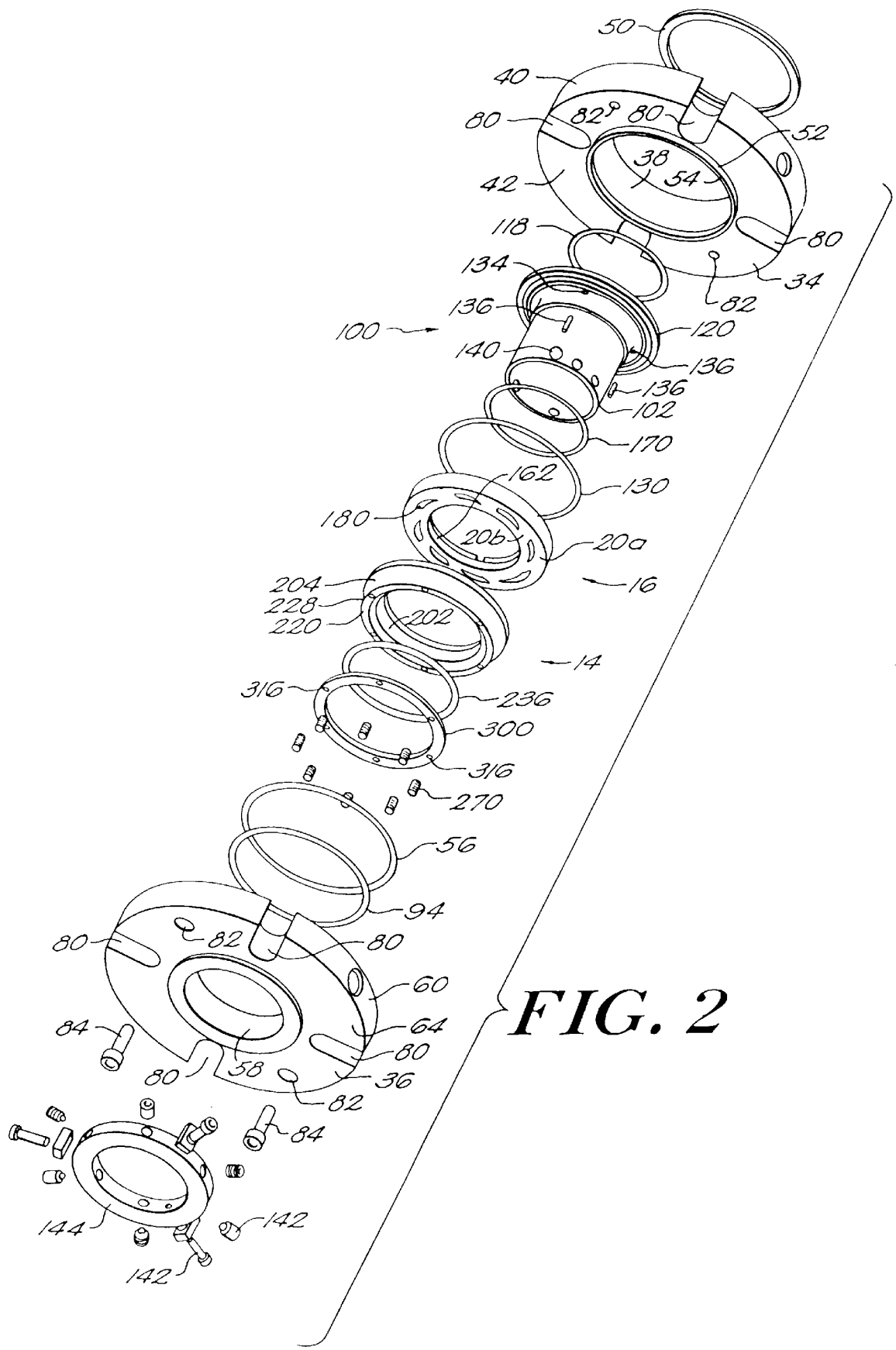
FIG. 2 is an exploded unassembled view of the seal components of the non-contacting mechanical face seal of FIG. 1 according to the teachings of the present invention.
Figure 3:
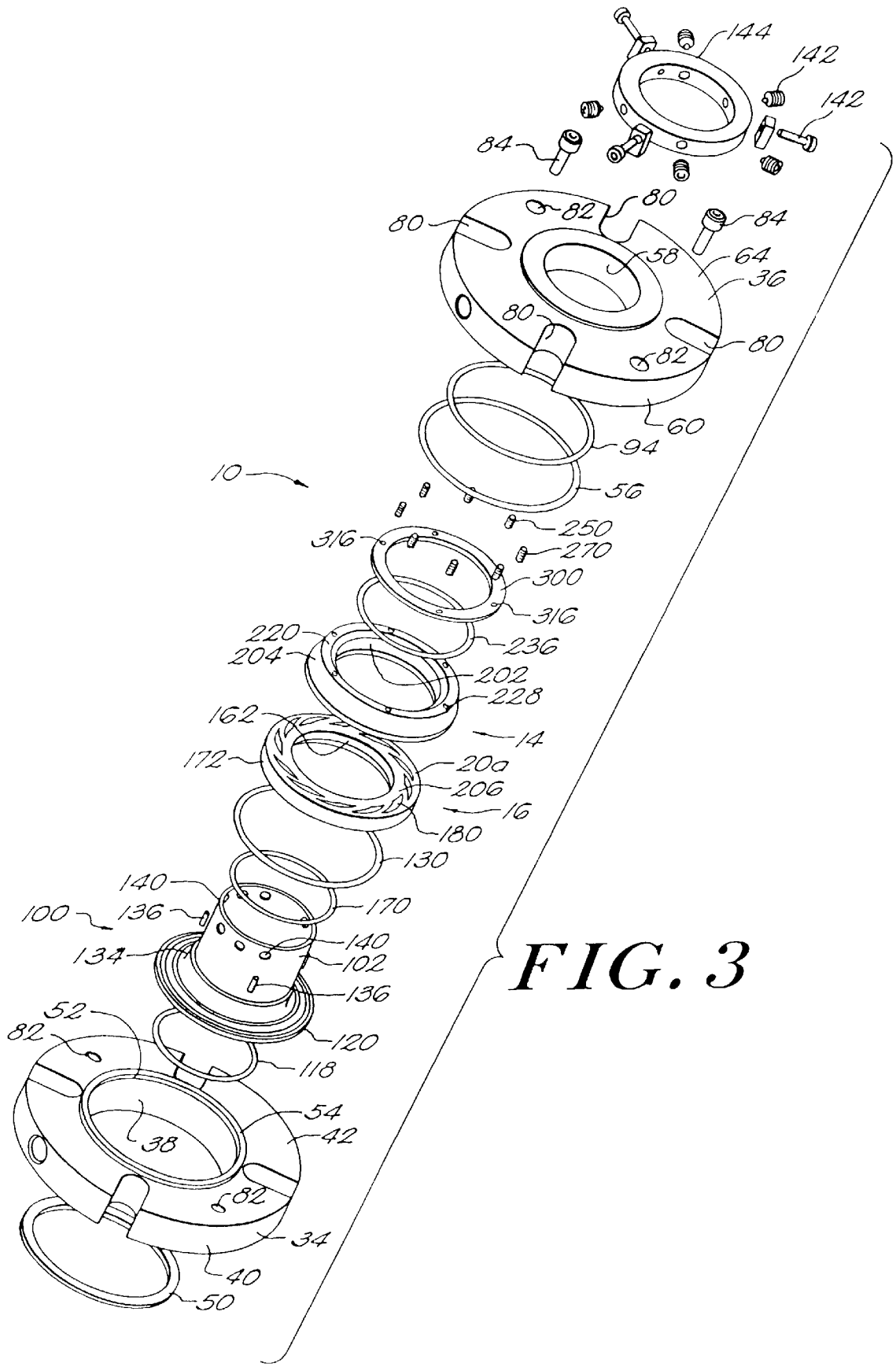
FIG. 3 is an exploded unassembled view, from a different perspective than FIG. 2, of the seal components of the non-contacting mechanical seal of FIG. 1 according to the teachings of the present invention.
Figure 7:
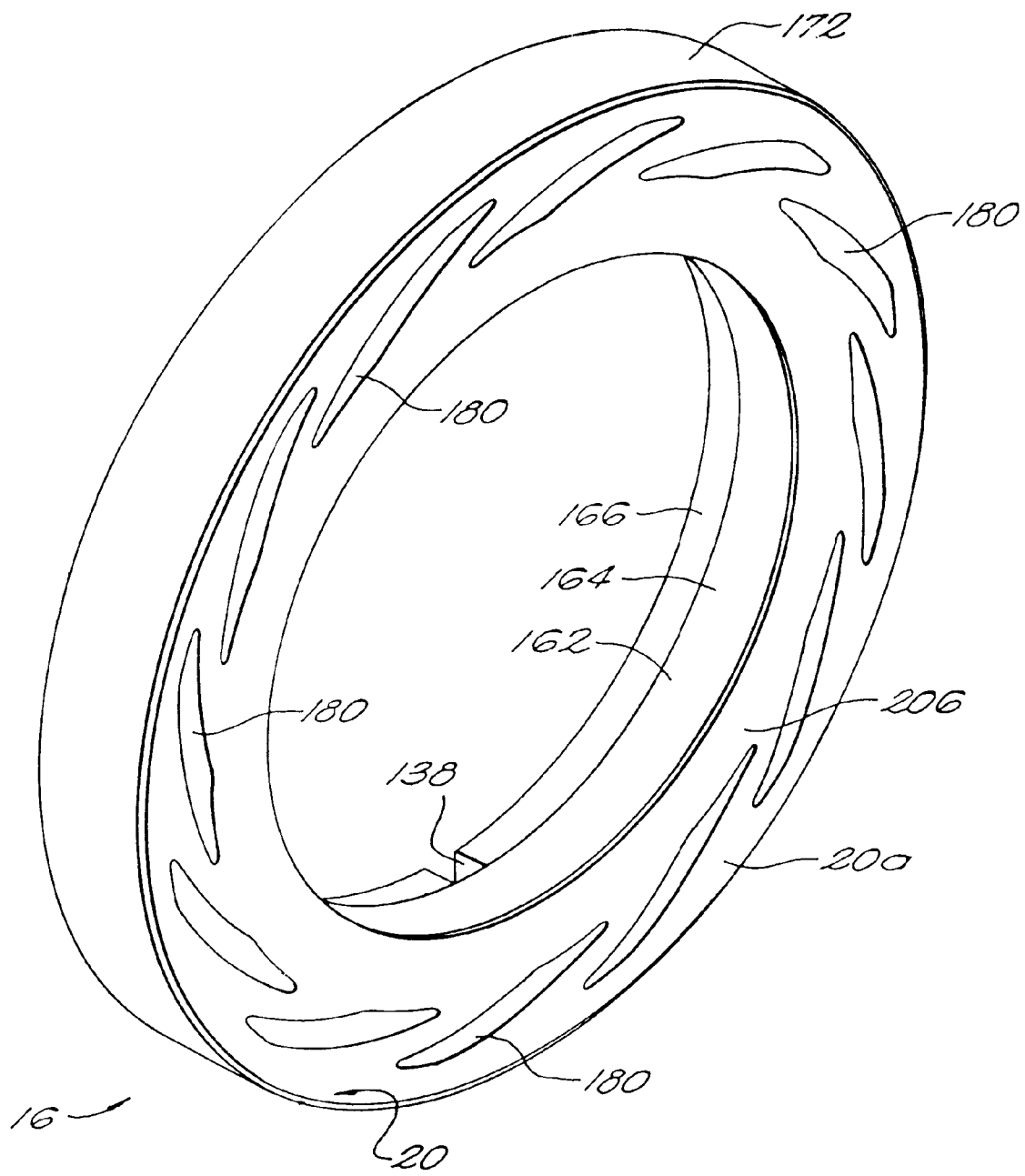
FIG. 7 is a perspective view of the rotary seal ring of the of the non-contacting mechanical face seal of FIG. 1 according to the teachings of the present invention.
Figure 8A:
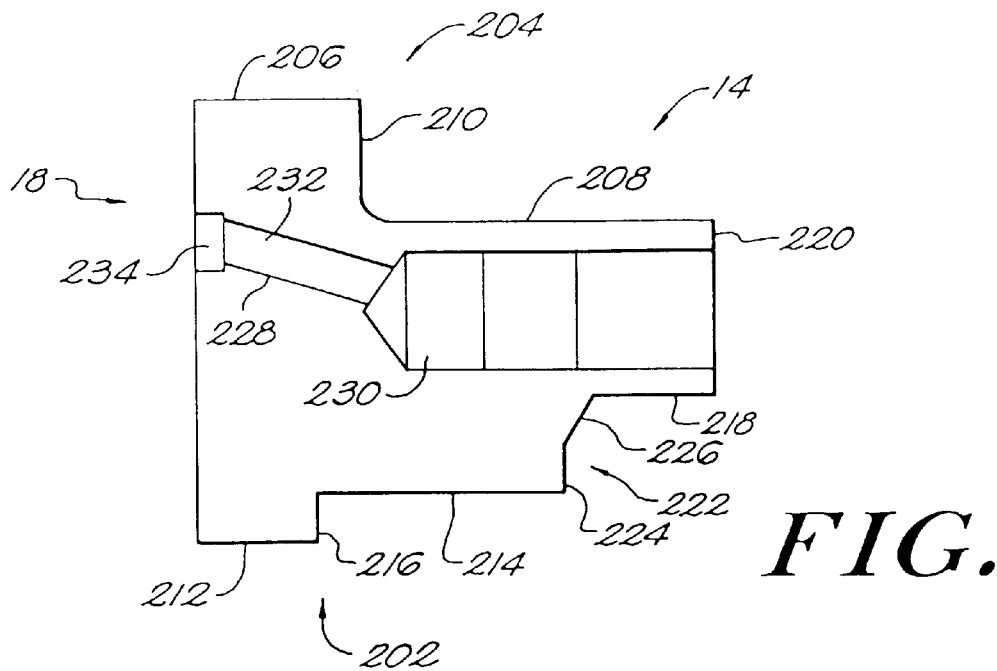
FIG. 8A is a side elevational view in cross-section of the stationary seal ring of FIG. 8.
Figure 8:
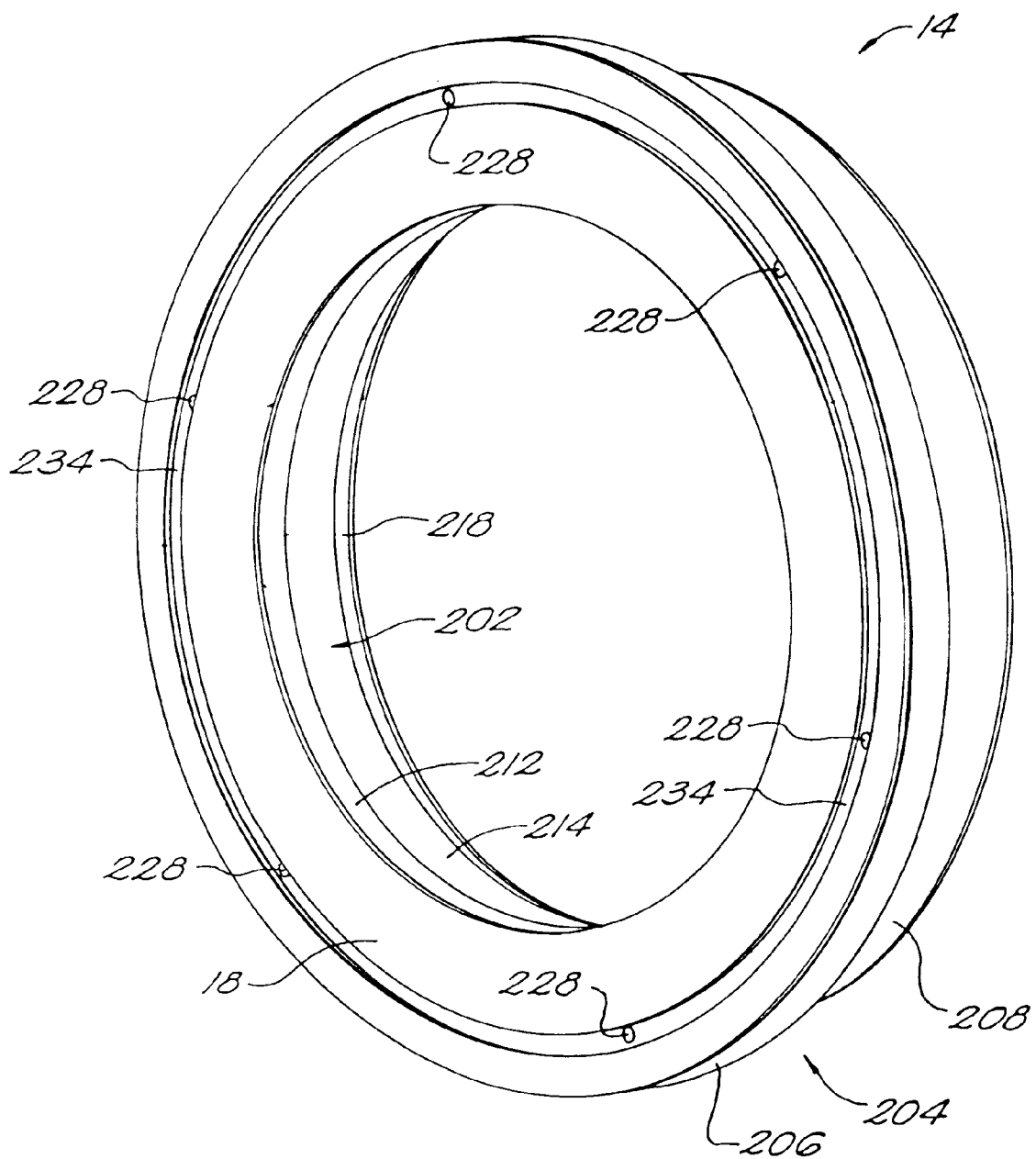
FIG. 8 is a perspective view of the stationary seal ring of the non-contacting mechanical face seal of FIG. 1 according to the teachings of the present invention.
Figure 9:
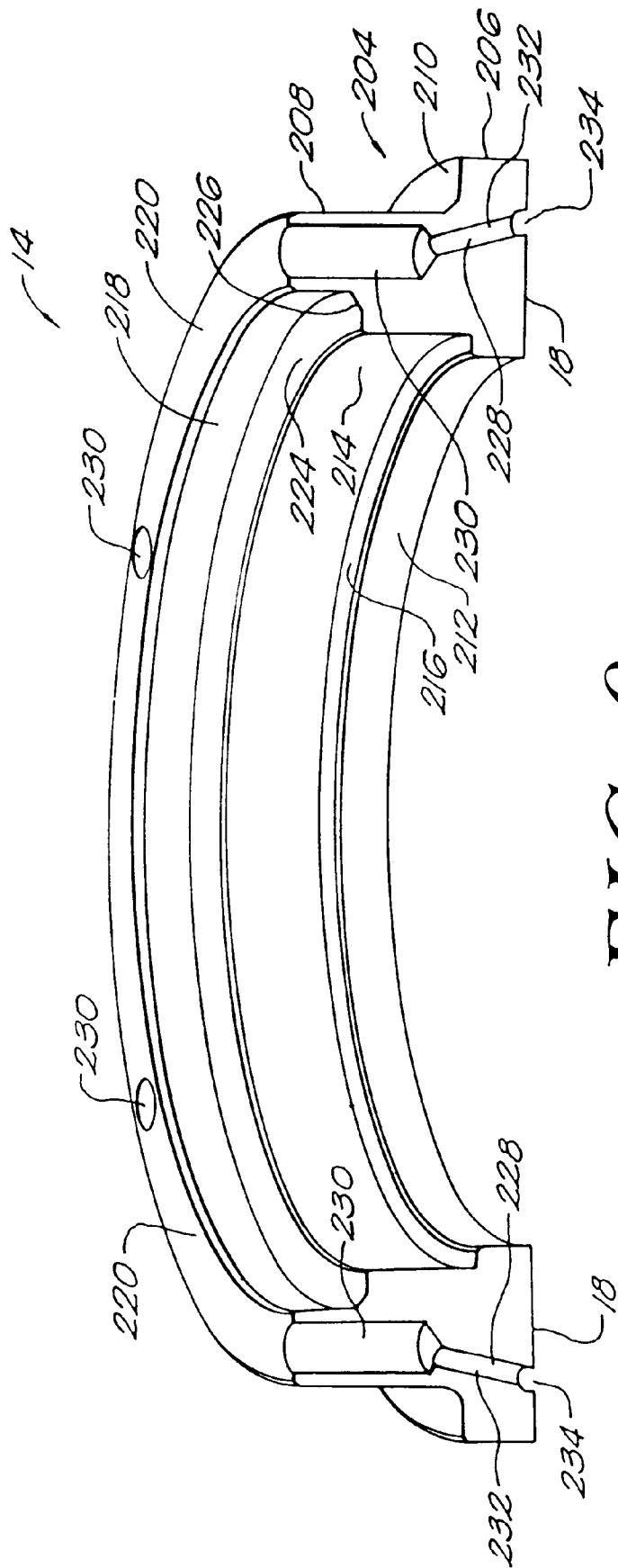
FIG. 9 is a perspective view in cross-section of the stationary seal ring of FIG. 8 according to the teachings of the present invention.

A mechanical face seal 10 in accordance with the present invention is shown in FIGS. 1, 2 and 3. The illustrated mechanical face seal 10 is concentrically disposed about a shaft 12 and is secured to an external wall of a fluid housing 11, such as a pump or the like. The shaft 12 extends along an axis 13, and is mounted, at least partially, in the housing 11. The seal 10 is constructed to provide fluid sealing between housing 11 and shaft 12, thereby preventing a process medium or fluid from escaping the housing 11. Fluid sealing is achieved by a stationary seal ring 14 and a rotary seal ring 16, each ring having a radially extending arcuate seal face 18 and 20, respectively, as shown in FIGS. 7 and 8. The seal face 18 of the stationary seal ring 14 is biased into a sealing relationship with the seal face 20 of the seal ring 16, as described in greater detail below. Thus, these individual seal surfaces form a fluid seal operable under a wide range of operating conditions and in a wide range of services, as described in greater detail below.

A similar seal is described in co-pending U.S. patent application Ser. No. 09/013,689, filed on Jan. 26, 1998 and entitled "Non-contacting Mechanical Face Seal Including Fluid Control System"; and in co-pending U.S. patent application Ser. No. 09/013,089, filed on Jan. 26, 1998 and entitled "Dual Non-contacting Mechanical Face Seal Having Concentric Seal Faces", both of which are incorporated herein by reference.

The terms "process medium" and "process fluid" used herein generally refer to the medium or fluid being transferred through the housing 11. In pump applications, for example, the process medium is the fluid being pumped through the pump housing.

The terms "axial" and "axially" used herein refer to a direction generally parallel to shaft axis 13. The terms "radial" and "radially" used herein refer to a direction generally perpendicular to shaft axis 13.

The mechanical seal 10 is preferably a mechanical non-contacting-type face seal in which a barrier fluid is introduced between the seal faces 18, 20 of the first and second seal rings 14, 16, respectively. Preferably, the barrier fluid used with the present seal is a gas. In a non-contacting-type mechanical face seal the barrier fluid acts to minimize, inhibit or prevent contact between substantial radial portions of the seal face 18 and radial portions of the seal face 20, thereby reducing the frictional engagement and the resulting wear of the seal faces 18, 20. Accordingly, a non-contacting-type mechanical face seal includes seal designs in which there is total separation of the seal faces at all times, total separation of the seal faces under certain conditions, i.e., during periods of shaft rotation, and occasional or partial separation of the seal faces. In contrast, a contacting-type face seal includes seal designs in which partial or complete contact of the seal faces is maintained. In both types of seals, the barrier fluid functions as a heat transfer medium to transfer heat away from the seal faces to reduce the effects of thermal stress on the seal faces.

With reference to FIGS. 1 through 5, the illustrated mechanical seal 10 includes, in addition to the stationary seal ring 14 and the rotary seal ring 16, a seal gland assembly 30 and a rotary seal ring sleeve 100. The seal gland assembly 30 includes a pair of gland plates, an inner gland plate 34 and an outer gland plate 36. The inner gland plate 34 is concentrically disposed about the shaft 12 and is positioned adjacent the housing 11 for connection thereto. The outer gland plate 36 is positioned axially adjacent along axis 13 and substantially parallel to the inner gland plate 34.

Figure 4:
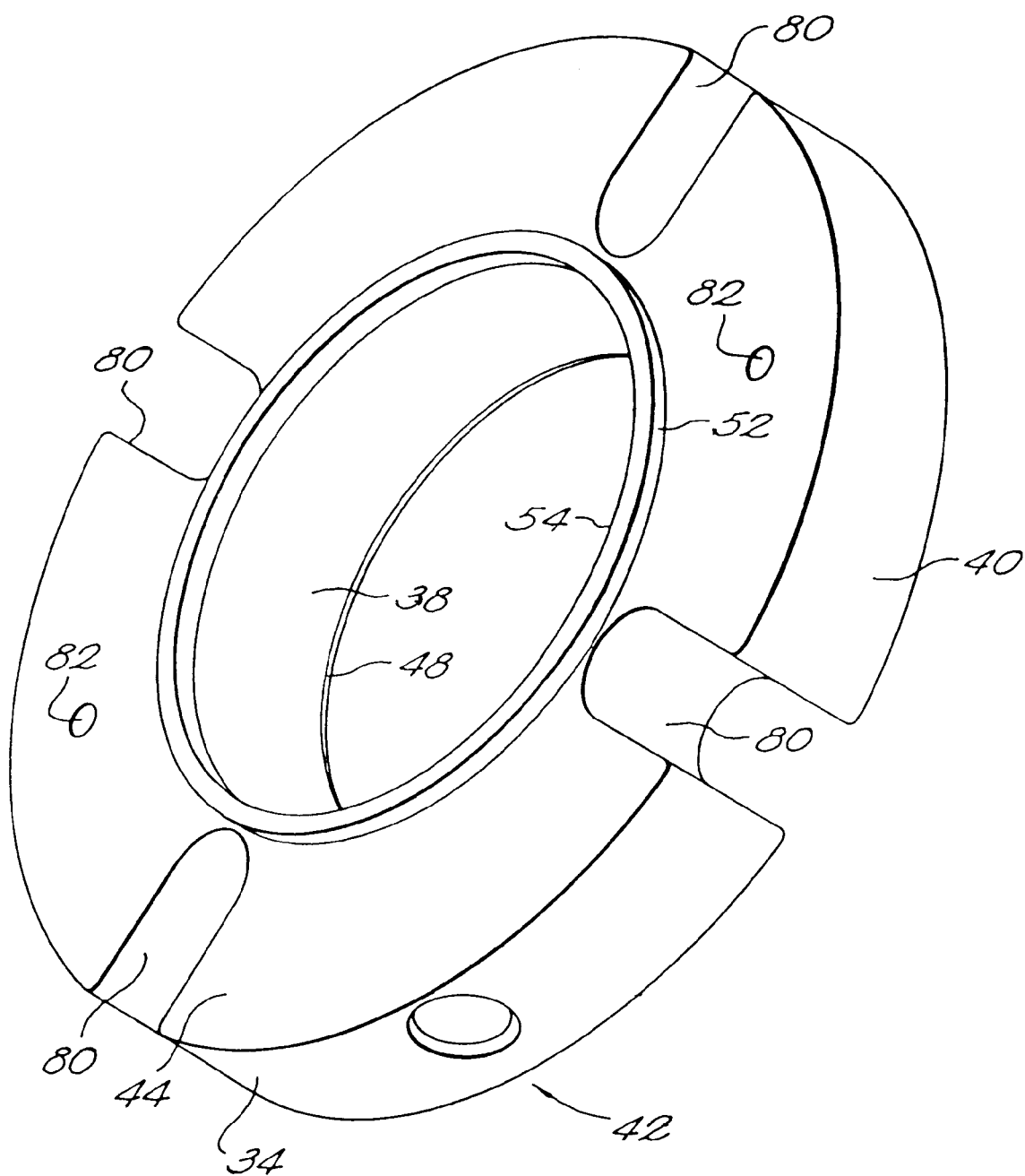
FIG. 4 is a perspective view of the inner gland plate of the non-contacting mechanical face seal of FIG. 1 according to the teachings of the present invention.

Referring to FIG. 4, the inner gland plate 34 has a radial inner surface 38 and a radial outer surface 40, as well as an axial inner surface 42 and an axial outer surface 44. The inner axial surface 42 is positioned proximate the housing 11 and has a housing gasket groove 48 formed therein adjacent the inner radial surface 38, as best illustrated in FIG. 1. The groove 48 seats a flat, annular housing gasket 50 that preferably has an axial dimension greater than the depth of the groove 48, thereby providing a pressure-tight and a fluid-tight seal between the mechanical seal 10 and the housing 11. The housing gasket 50 is preferably mounted in the groove 48 and secured thereto by an adhesive. This arrangement helps to prevent leakage of the process medium along the mating portions of the mechanical seal 10 and the housing 11 when mounted together.

Referring again to FIGS. 1 through 4, an annular inner gland plate sealing portion or collar 52 extends axially outwardly from the outer surface 44 and includes a radially extending surface 54. The radially extending surface 54 of the inner gland plate sealing portion 52 is dimensioned to abut a gland plate O-ring 56 to provide sealing between the inner gland plate 34 and the outer gland plate 36 when the gland plates are mounted together.

The outer gland plate 36 has an axially extending inner surface 58 and an axially extending outer surface 60, as well as a radially extending inner surface 62 and a radially extending outer surface 64, as shown in FIGS. 1–3, 5 and 5A. Beginning from the outer surface 60, the radial inner surface 62 includes a first radially extending surface portion 66 and a second radially extending surface 68 that is stepped radially inwardly from the first radially extending surface 66. A gland gasket groove 70 is formed in the second radially extending surface 68 adjacent the first radially extending surface 66. An axially extending first surface 72 connects the second radially extending surface 68 and a third radially inwardly extending surface 74. An axially extending second surface 76 connects the third radially extending surface 74 and a fourth radially extending surface 78.

Figure 5:
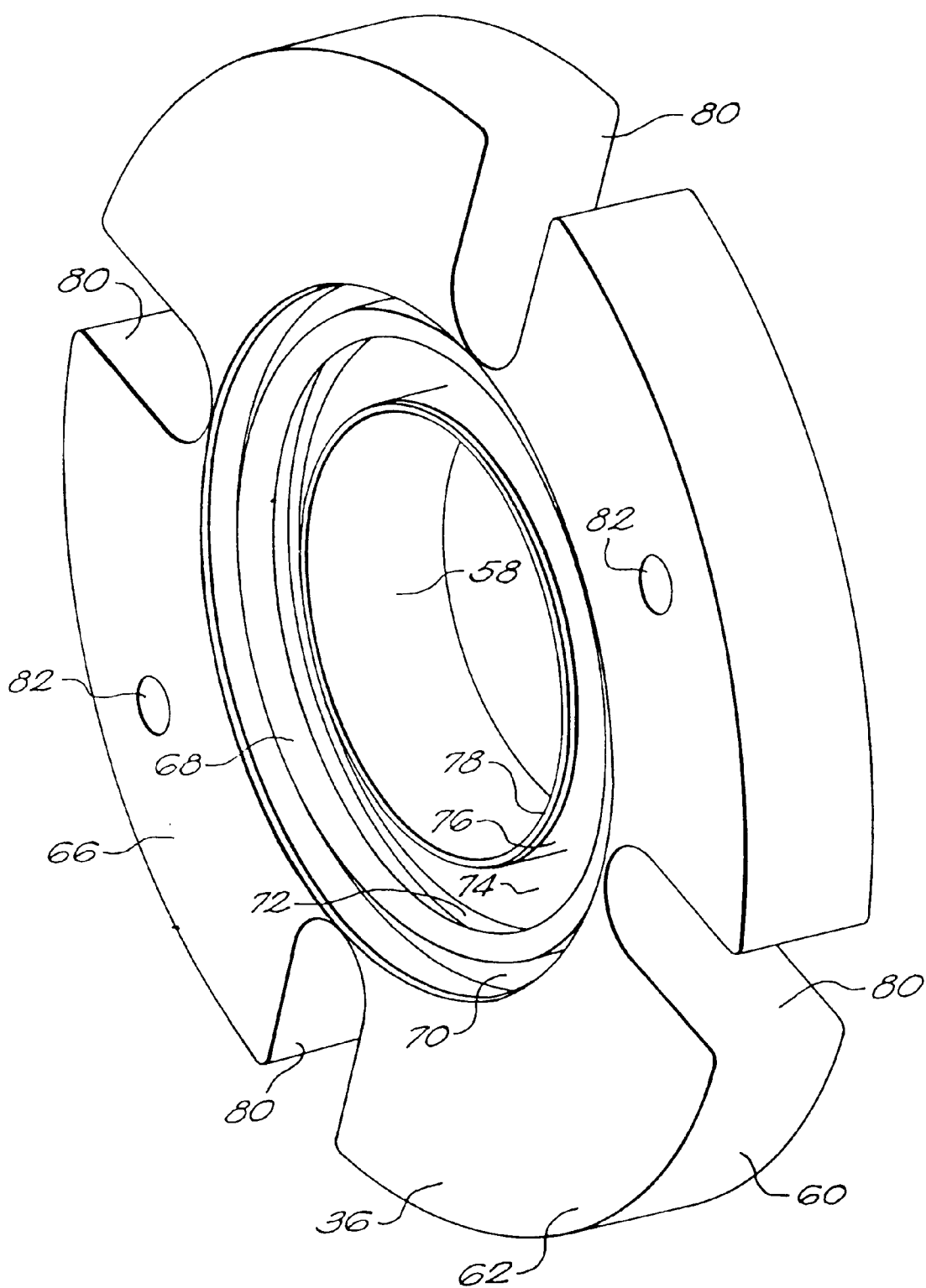
FIG. 5 is a perspective view of the outer gland plate of the non-contacting mechanical face seal of FIG. 1 according to the teachings of the present invention.
Figure 5A:
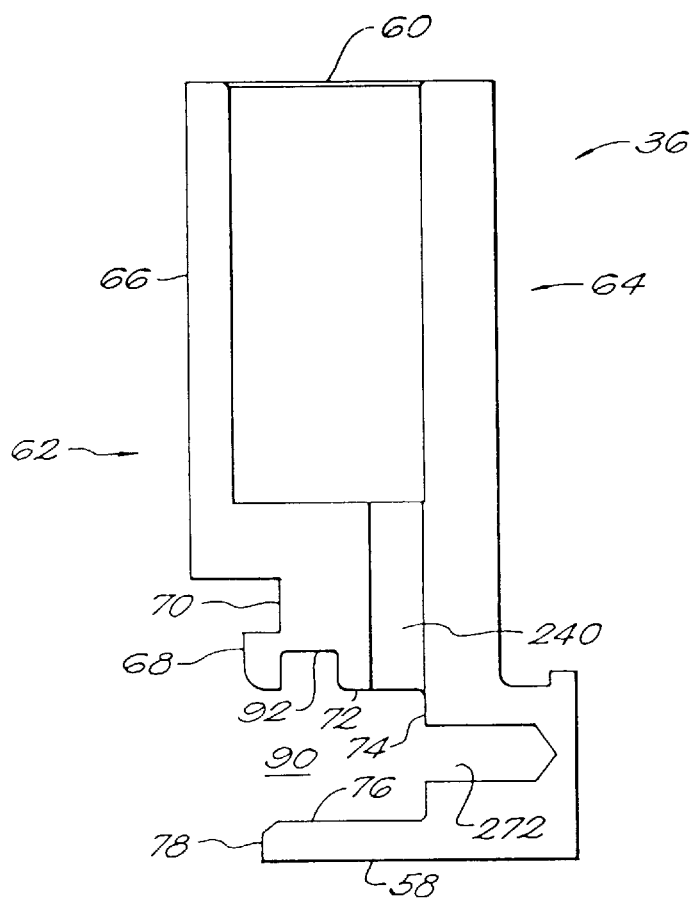
FIG. 5A is a side elevational view in cross-section of the outer gland plate of FIG. 5 according to the teachings of the present invention.

A stationary seal ring receiving chamber 90 is formed by the first surface 72, the third radially extending surface 74, and the second surface 76 of the stationary seal ring 14, as illustrated in FIG. 5A. A groove 92 is formed in the first surface 72 to seat an elastomeric member 94, such as an O-ring, for sealing against the stationary seal ring member 14.

The gland plate O-ring 56 is seated within the gland gasket groove 70 of the outer gland plate 36. When the gland plates 34 and 36 are assembled, the radially extending surface 54 of the inner gland plate sealing portion abuts and compresses the gland plate O-ring 56 into the gland gasket groove 70. In this manner, gland plate O-ring 56 functions to form a fluid-tight and a pressure-tight seal between the gland plates. Furthermore, the outer diameter of the annular collar 52 is slightly smaller than the outer diameter of the groove 70, such that when assembled, the collar 52 outer surface is closely disposed to or mates with the radially outer wall of the groove 70.

Each of the gland plates 34 and 36 include four fastener recesses 80 to accommodate bolts (not shown) to mount mechanical seal 10 of the invention to the housing 11. Alternatively, bolt-tabs may be provided about the periphery of the seal 10 to facilitate connection of the seal 10 to the housing 11. Examples of suitable bolt tabs are shown in U.S. Pat. No. 5,209,496 and U.S. Pat. No. 5,571,268. both of which are assigned to the assignee hereof and are incorporated herein by reference. Each of the gland plates also include two fastening apertures 82 to accommodate bolts 84 for coupling the inner gland plate 34 to the outer gland plate 36.

As illustrated in FIGS. 1 through 3 and 6, a rotary seal ring sleeve 100 is disposed within the inner chamber formed by the gland assembly 30. The rotary seal ring sleeve 100 includes an axially-extending, cylindrical sleeve body 102 having an axial outer end 104 and an axial inner end 106, as well as an outer surface 108 and an inner surface 110. The outer surface 108 of the sleeve 100 includes a first outer surface 112 proximate the outer end 104 and a second outer surface 114 proximate the inner end 106 and stepped radially outward from the first outer surface 112. In a preferred embodiment, the outer diameter of the first outer surface 112 is less than the diameter of the inner radial surface 58 of the outer gland plate 36. This clearance allows the sleeve 100 to seat within the gland assembly 30 for unobstructed rotational movement therein.

The diameter of the inner surface 110 of the sleeve 100 is preferably equal to or slightly greater than the diameter of the shaft 12, to which the sleeve 100 is to be attached, as illustrated in FIG. 1. The inner surface 110 has formed thereon an annular channel 116 for mounting a shaft gasket 118. When mounted in the channel 116, the gasket 118 sealingly mates with the shaft 12, providing a fluid-tight seal along the sleeve and the shaft interface, FIG. 1.

Figure 6:
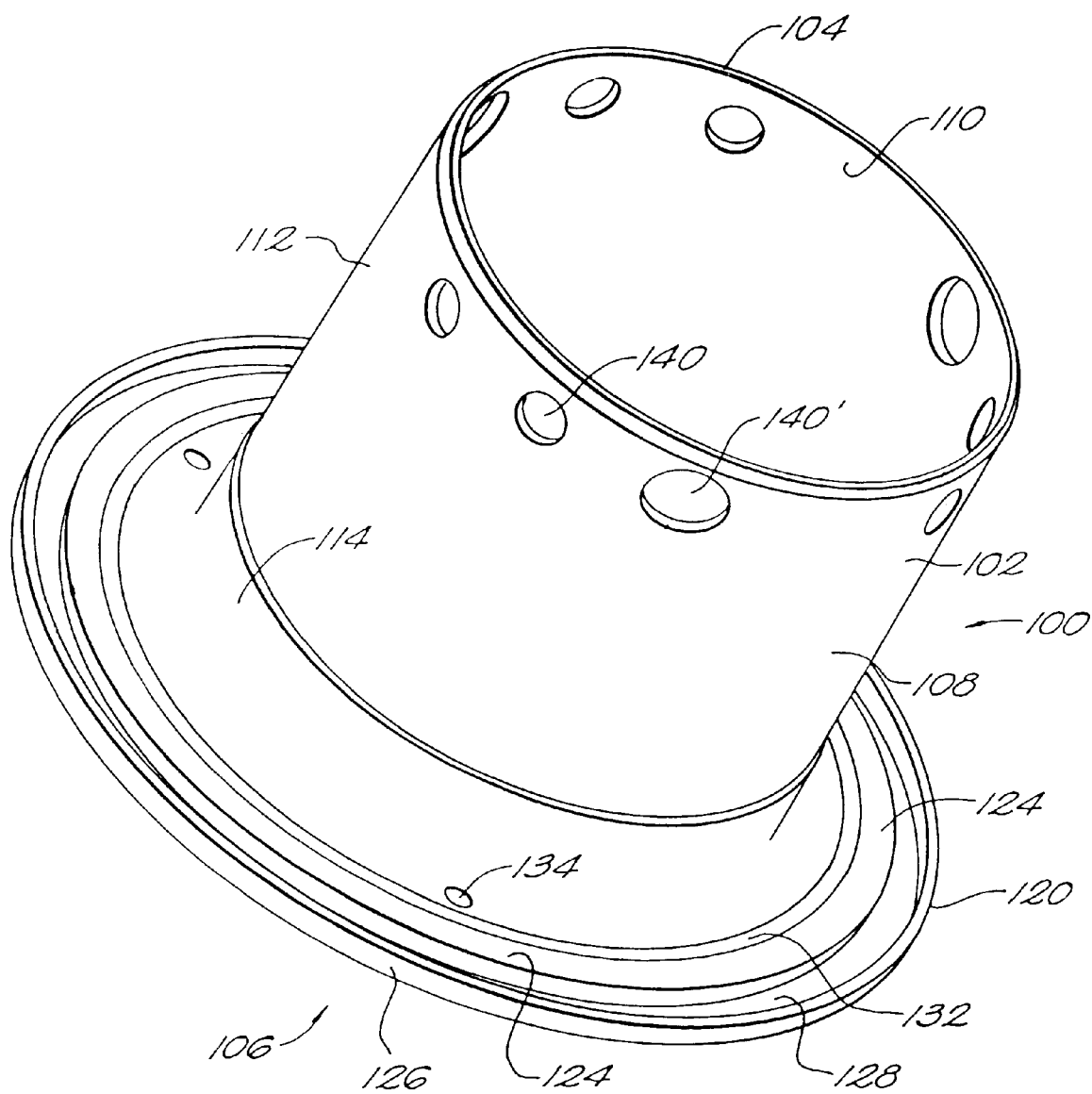
FIG. 6 is a perspective view of the sleeve for supporting the rotary seal ring of the non-contacting mechanical face seal of FIG. 1 according to the teachings of the present invention.

Referring to FIGS. 1 and 6, a flange 120 extends radially outwardly from the sleeve body 102 proximate to the axially inner end 106. The flange 120 has an axially inner surface 122 and an axially outer surface 124. A radial outer surface 126 extends axially between the inner surface 122 and the outer surface 124. Preferably, the diameter of the outer surface 126 is less than the diameter of the inner radial surface 38 of the inner gland plate 34. This clearance allows the flange 120 to seat within the gland assembly 30 for unobstructed rotational movement therein.

The outer surface 124 has an annular groove 128 formed therein for receiving an elastomeric sealing member 130, such as an O-ring, as described in more detail below. A first outer surface 132 is stepped axially outward from the outer surface 124 of the sleeve 100 and is located radially inward from the annular groove 128.

A plurality of bores 134 are formed through the flange 120, each one of which receives one end of a drive pin 136, as illustrated in FIGS. 1 and 6. The other end of the drive pin 136 is received in a corresponding slot 138 in the rotary seal ring 16. The drive pins 136 operate to impart rotational motion to the rotary seal ring 16.

Figure 11:
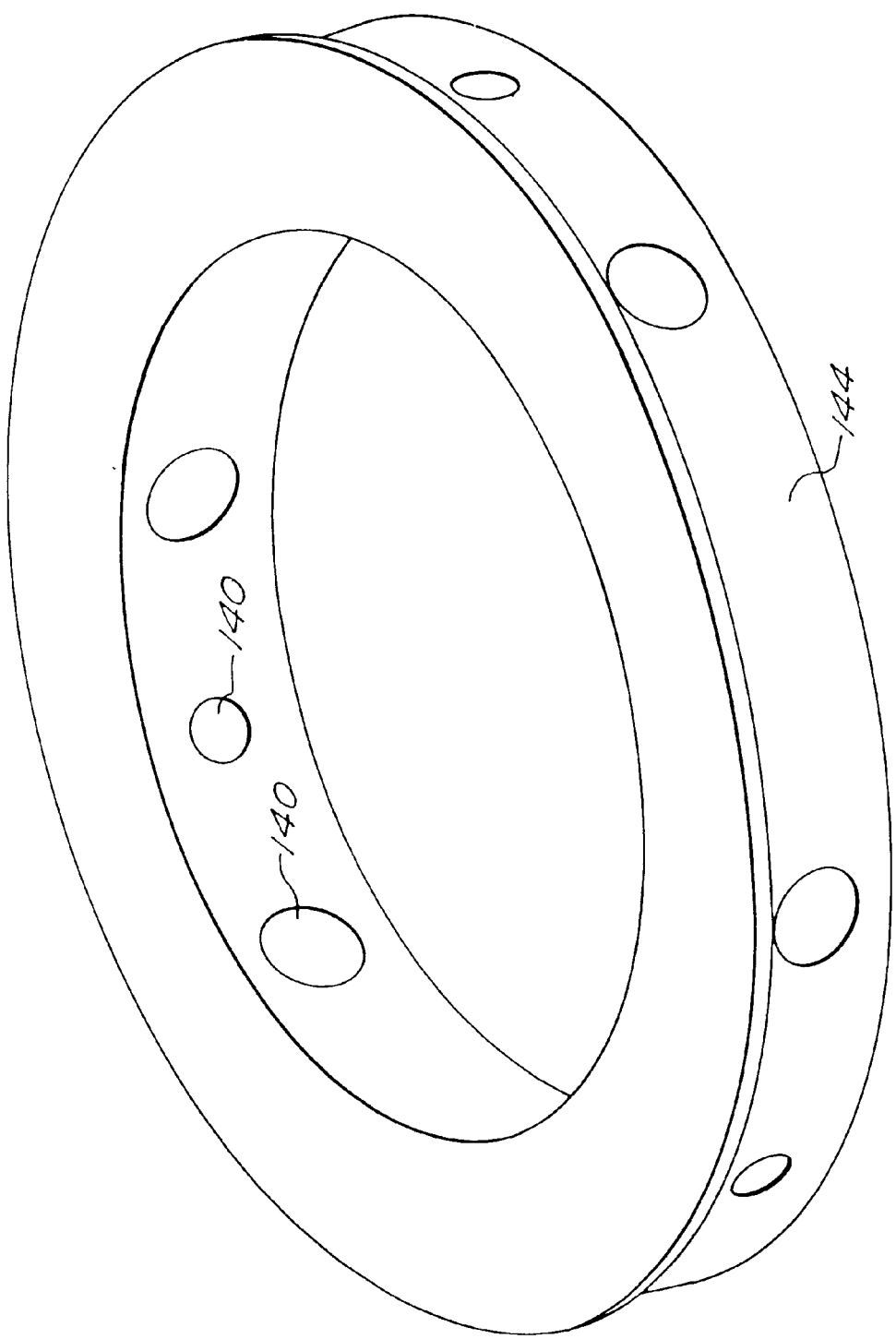
FIG. 11 is a perspective view of the lock ring of the non-contacting mechanical face seal of FIG. 1 according to the teachings of the present invention.

The axial outer end 104 of the sleeve 100 includes a plurality of variously sized fastener-receiving apertures 140 that mount screws 142, as illustrated in FIGS. 2, 3, and 6. The screws are mounted to the sleeve 100 through a lock ring 144, as shown in FIG. 11. The screws 142 are provided to radially and axially secure the sleeve 100, and thus the rotary seal ring 16, to the shaft 12 for rotation therewith.

The rotary seal ring sleeve 100, the gland assembly 30, and the lock ring 144 can be formed from any suitably rigid material, such as, for example, stainless steel or other metal alloys.

With reference to FIGS. 1 through 3, 7 and 7A, the rotary seal ring assembly 16 includes an arcuate inner surface 162. The inner surface 162 includes a first axially extending surface 164 extending axially from the seal face 20 of the rotary seal ring 16. The inner diameter of the first surface 164 of the rotary seal ring is preferably greater than or equal to the diameter of the second outer surface 114 of the sleeve to permit mounting of the rotary seal ring upon the sleeve. A radially extending connecting wall 168 connects the first surface 164 to a second surface 166. The second surface 166 of the rotary seal ring 16 is stepped radially outward from the first surface 164 to accommodate an elastomeric centering member 170, such as an O-ring. The elastomeric centering member 170 seats against the second surface 166 and the connecting wall 168 of the rotary seal ring, as well as the second outer surface 114 of the sleeve 100, to center the rotary seal ring 16 about the sleeve 100.

The rotary seal ring includes a substantially smooth, arcuate axially extending outer surface 172. The diameter of the outer surface 172 is preferably less than the diameter of the inner surface 38 of the inner gland plate 34.

The rotary seal ring 16 includes a rear surface 174 extending radially between the outer surface 172 and the inner surface 166. Elastomeric sealing member 130 sealingly abuts the outer surface 174 of the rotary seal ring 16 and seats within the annular groove 128 to form a fluid-tight, pressure-tight seal between the rotary seal ring and the sleeve. The first outer surface 132 of the sleeve 100 also abuts the rear surface 174 of the rotary seal ring. The first outer surface 132 functions to provide additional supporting of the rotary seal ring on the sleeve and limits the amount of compression of the elastomeric seal ring 130, as well as controlling pivoting or coning of the rotary seal ring under pressure.

Figure 7A:
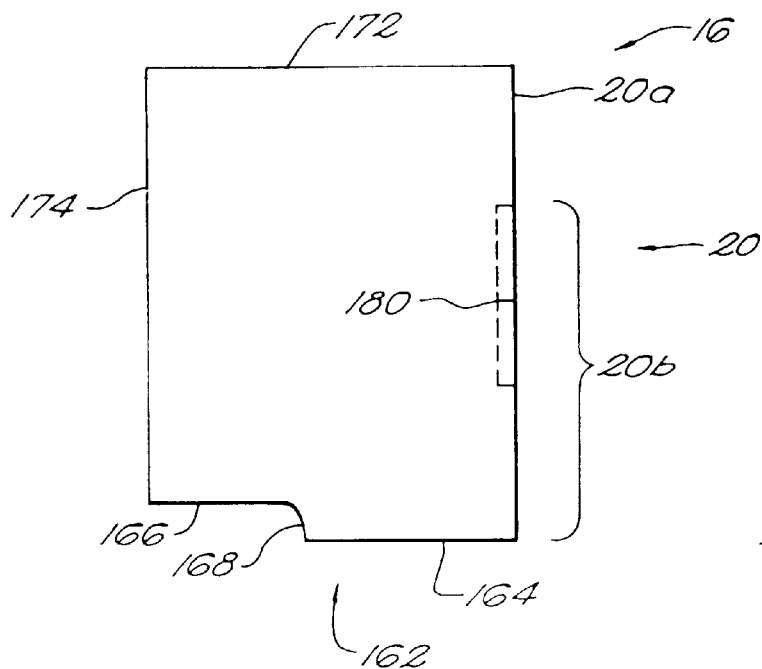
FIG. 7A is a side elevational view in cross-section of the rotary seal ring of FIG. 7.

The illustrated seal face 20 of the rotary seal ring segments has a plurality of pumping grooves 180 formed therein, as is best shown in FIG. 7. The term "pumping groove" is used herein to denote any type of surface recess formed in one or the other or both of the seal rings which functions in combination with a fluid to generate lifting pressure fields, such as hydrodynamic lifting forces, between the seal faces. The pumping grooves can include any suitable recess configuration, such as spiral grooves and Raleigh step-type grooves, that operate in combination with a fluid to lift and separate the seal faces from each other during use. According to a preferred embodiment, the illustrated grooves are spiral-type grooves that are dependent on shaft speed to separate hydrodynamicly the seal faces. For the sake of clarity, the grooves are hereinafter called spiral grooves, although it is to be understood that other types of grooves can be employed. In a preferred embodiment, the spiral grooves 180 are radially disposed between the inner surface 162 and the outer surface 172 of the rotary seal ring 16. The spiral grooves 180 accordingly split the rotary seal ring seal face 20 into two concentric seal faces 20a and 20b. In this manner a dual seal having separate concentric seal faces 20a and 20b on a single seal ring is formed. Referring to FIG. 7A, the first concentric seal face 20a begins at the outer surface 172 and extends to the outer radial edge of the spiral grooves 180. The second concentric seal face 20b extends from either the inner radial edge of the spiral grooves 180 to the inner surface 162 of the rotary seal ring, or in an alternate practice, from the outer radial edge of the spiral grooves 180 to the inner surface 162. The second seal face 20b can thus include the spiral grooves 180 and the land or dam portion of the seal face 20 disposed radially inward from the spiral grooves. According to a preferred embodiment, the concentric seals are co-planar.

When assembled, the stationary seal ring 14 and the rotary seal ring 16 are substantially aligned such that the seal face 18 overlies or is disposed in registration with at least a portion of the seal face 20a, the spiral grooves 180, and the seal face 20b. This arrangement forms dam portions or lands on either side of the grooves 180 that help control or regulate the leakage of fluid through the seal faces 18, 20. According to the illustrated embodiment, the seal face 18 of the stationary seal ring 14 overlies a significant portion of the first concentric seal face 20a and a significant portion of the second concentric seal face 20b.

With reference to FIG. 1, the grooves 180 communicate with the seal face 18 of the stationary seal ring 14. A barrier fluid at a specified regulated pressure $P_b$, generally greater than the process pressure $P_p$ and the ambient pressure $P_a$, is introduced to the grooves 180 through barrier fluid conduits 228 formed in the stator seal ring 14, as described in further detail below. The barrier fluid acts to provide a separation force on the seal faces 18 and 20. The separation force operates to minimize, inhibit, or prevent contact between radial portions of the seal face 18 and radial portions of the seal faces 20a and 20b, thereby reducing the frictional engagement and the resulting wearing of the seal faces 18, 20a and 20b.

The type of separation force formed between the seal faces varies radially across the rotary seal face 20. At the first seal face 20a, the separation force is primarily or generally completely a hydrostatic separation force. The terms "hydrostatic separation force" and "hydrostatic force" used herein refer to a force having a magnitude that is independent of the shaft rotation speed and is at least partially and preferably significantly dependent upon the magnitude of any pressure differential developed across the area upon which the force is acting. Accordingly, the magnitude of the primarily hydrostatic separation force acting upon seal face 20a, as well as the corresponding portion of the seal face 18, is at least partially dependent upon the magnitude of the pressure differential between the barrier fluid pressure $P_b$ and the process fluid pressure $P_p$ across the seal face 20a and is independent of the speed at which the shaft 12 and thus the rotary seal ring 16 rotates.

The separation force developed between the rotary seal ring second seal face 20b, which for purposes of this discussion includes the spiral grooves 180, and the stationary seal ring seal face 18 includes both hydrostatic and hydrodynamic force components. The terms "hydrodynamic separation force" and "hydrodynamic force" used herein refer to a force having a magnitude that is dependent upon the relative velocity of the seal faces. Accordingly, the magnitude of the separation force acting upon the second seal face 20b, as well as the corresponding portion of the seal face 18, is dependent upon at least two factors: the pressure differential between the barrier fluid pressure $P_b$ and the ambient fluid pressure $P_a$ across the seal face 20b (the hydrostatic component); and the velocity at which the rotary seal ring seal face 20b rotates relative to the stationary seal ring face 18, i.e., the shaft rotation speed (the hydrodynamic component). The hydrodynamic component of the separation force acting on the rotary seal ring second seal face 20b is generated by the pressure differential created by the pumping action of the spiral grooves 180 in a manner that is known in the art. Those of ordinary skill will recognize that the force distribution can be reversed, that is, the primarily hydrostatic force can be located along the inner diameter, e.g., along seal face 20b, and the hydrostatic and hydrodynamic forces can be located along the outer diameter, e.g., along seal face 20a. One of ordinary skill will recognize that this reverse arrangement may require modification of the groove configuration, as well as changing of the radial location of the barrier fluid conduits on the stationary seal ring seal face 18. This reverse arrangement is particularly suitable for seal applications where the process fluid is disposed along the inner diameter rather than the outer diameter.

A significant advantage of the force distribution feature of the mechanical seal 10 of the present invention is that it allows for adjustment of seal face contact and thus adjustment of the gap thickness formed between the seal faces 18 and 20, prior to start-up, i.e., prior to shaft rotation. By increasing the barrier fluid pressure $P_b$ over the process fluid pressure $P_p$, and thus the pressure differential across the seal faces, a hydrostatic separation force can be produced at both the first and second seal faces 20a and 20b of the rotary seal ring. Because the closing force on seal face 20a is only applied by process fluid pressure $P_p$, as described below, the degree of seal face contact, i.e., the magnitude of the gap between the seal faces, can thus be controlled by adjusting the barrier fluid pressure $P_b$ between the seal faces prior to start-up or at low and substantially low rotation speeds. In this manner, contact between the seal faces 18, and 20a, and 20b at start-up or at low shaft speeds can be minimized or eliminated thereby reducing wear on the seal faces. Accordingly, the seal of the present invention provides the benefits of hydrostatic operation at low shaft speeds, while concomitantly providing the high-speed benefits of hydrodynamic operation.

A further advantage of the seal of the present invention is that the seal is not limited to any specific spiral groove configuration. For example, the spiral grooves 180 can be uni-directional or bi-directional grooves. As is known in the art, uni-directional grooves allow for seal face separation only in one direction of shaft rotation, while bi-directional grooves permit separation in both directions of rotation. Examples of suitable spiral groove designs are described in U.S. Pat. Nos. 3,499,653, 4,889,348, 5,143,384 and 5,529,315, all of which are incorporated herein by reference. The illustrated spiral groove is a uni-directional groove that pumps barrier fluid from the high pressure process region of the seal located along the groove 234 of the stationary seal ring 14 to the lower pressure region located along the inner diameter of the rings. Those of ordinary skill will readily recognize that the illustrated seal can also be used with bi-directional grooves, common types of which are known in the art.

As shown in FIGS. 1, 8, 8A, and 9, the stationary seal ring 14 has an axially extending inner surface 202 and an axially extending outer surface 204. The outer surface 204 includes a first outer surface 206 that extends axially from the stationary seal ring face 18, as well as a further axially extending second outer surface 208 that is stepped radially inward from the first outer surface 206. The first outer surface 206 and the second outer surface 208 form in combination therewith a first annular connecting wall 210 that extends radially between the first and second outer surfaces.

The inner surface 202 includes a first inner surface 212 that extends axially from the stationary seal ring face 18, as well as a further axially extending second inner surface 214 that is stepped radially inward from the first inner surface 206. The first inner surface 212 and the second inner surface 214 form in combination therewith a first annular connecting wall 216 that extends radially between the first and second inner surfaces. A third inner surface 218 extends axially to a rear surface 220 and is stepped radially inward from the second inner surface 214. A second connecting wall 222 connects the second inner surface 214 and the third inner surface 218 and includes a radially extending section 224 and a beveled section 226.

The inside diameter of the first inner surface 212 of the stationary seal ring 14 is greater than the diameter of the first outer surface 112 of the sleeve 100, and is greater than the diameter of the first inner surface 164 of the rotary seal ring 16, thereby allowing motion of both the shaft 12, the sleeve 100 and the rotary seal 16 relative to the stationary seal ring 14. The elastomeric member 94 seats within the outer gland plate groove 92 and abuts the second outer surface 208. A second elastomeric member 236 is positioned to abut the beveled section 226 and the radially extending section 224 of the connecting wall 222 of the stationary seal ring 14, as well as the second surface 76 of the outer gland plate 36. The second elastomeric member 236 is biased into sealing contact with the inner surface 222 of the stationary seal ring 14 and the second surface 76 of the outer gland plate 36, as described in greater detail below. The elastomeric members 94 and 236 function to form fluid-tight and pressure-tight seals between the outer gland plate 36 and the stationary seal ring 14, when the stationary seal ring is positioned within stationary seal ring receiving chamber 90. The stationary seal ring 14 is preferably composed of a carbon or ceramic material.

With reference to FIGS. 1, 8, 8A, and 9, a plurality of barrier fluid bores 228 are formed in the stationary seal ring 14. The bores 228 include an axially extending section 230 that extends axially from the rear surface 220 and a diagonal section 232 that communicates with and extends from the axial section 230 to a continuous, circumferential groove 234 formed in the seal face 18. Barrier fluid from a barrier fluid supply, not shown, is introduced to the seal surfaces 18, 20 of the seal rings and the grooves 180 formed in the seal face 20 through the bores 228 and the groove 234.

One skilled in the art will recognize that the barrier fluid bores are not limited to the number or shape described and illustrated herein. For example, a single barrier fluid bore can be provided. Likewise, the position and arrangement of the barrier fluid bores is not limited to those specifically disclosed herein, as alternative positions and arrangements are possible to achieve the same results. For example, the barrier fluid bores can be formed in rotary seal ring 16, as well a the stationary seal ring 14, and can extend from the seal faces to any outer surface of the seal rings. In addition, the barrier fluid bore can extend linearly from the seal faces 18, 20 to an outer surface of the seal ring.

Figure 5B:
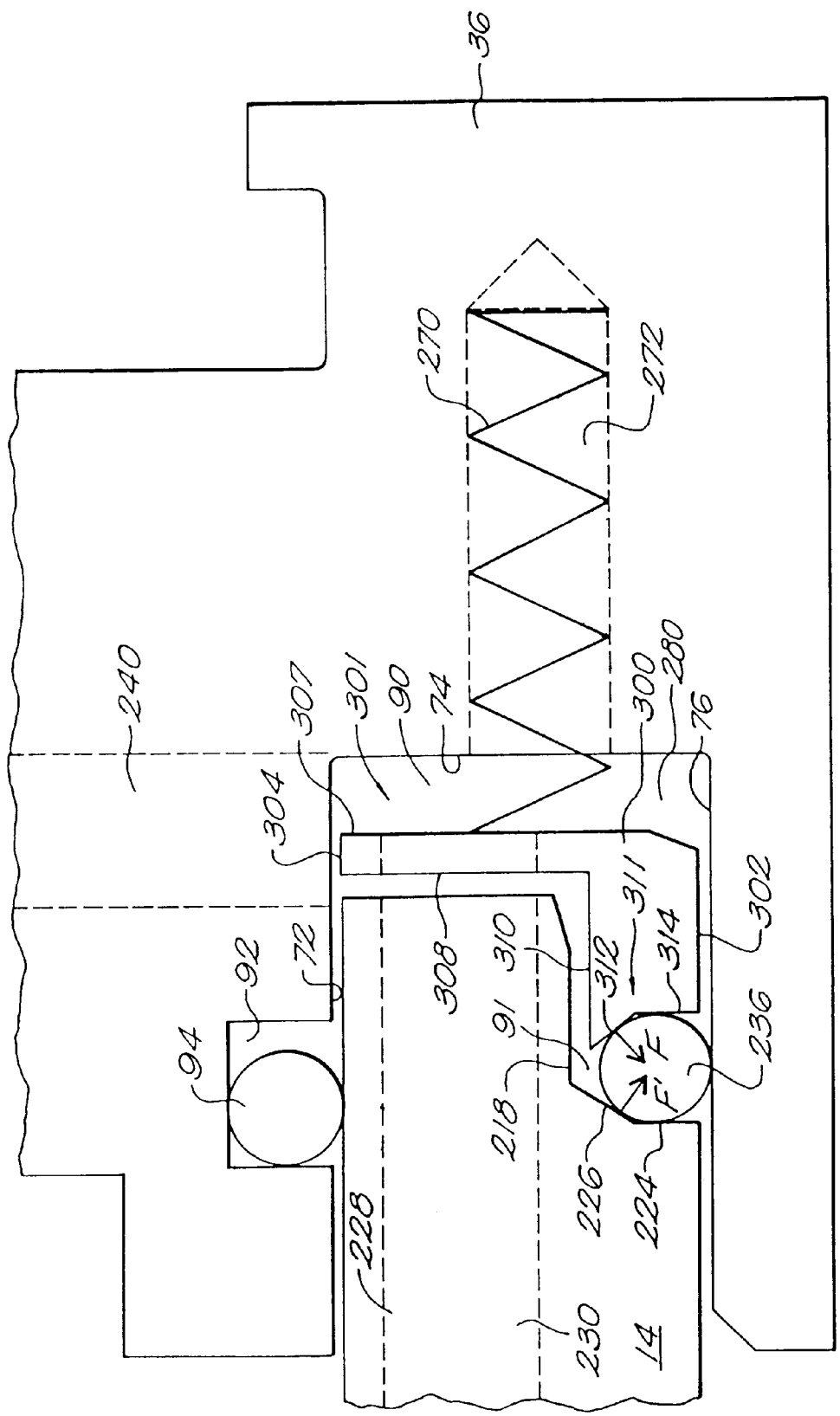
FIG. 5B is a partial side elevational view in cross-section of the outer gland plate of FIG. 5 showing the stationary seal ring and the compression plate seated within the outer gland plate.

As best shown in FIGS. 1, 5A and 5B, each axial section 230 of the barrier fluid bores 228 opens at the rear surface 220 of the stationary seal ring 14 to provide fluid communication between the bores 228 and a similar radial barrier fluid bore 240 formed in the outer gland plate 36. The bore 240 formed in the outer gland plate 36 opens at one end at the outer surface 60 of the gland assembly and at the other end at the first surface 72 of the outer gland plate 36. Barrier fluid from a barrier fluid supply (not shown) is supplied through the gland bore 240 to each of the stationary seal ring segment bores 228.

A plurality of stationary sealing ring bores 252 are formed within the outer gland plate 36, each one of which receives one end of a retaining pin 250, as illustrated in FIG. 1. The other end of each of the pins 250 is received in the axial section 230 of one of the barrier fluid bores 228 of the stationary seal ring 14. The outer diameter of each of the pins 250 is preferably less than the inner diameter of the axial section 230 of the barrier fluid bores 228 such that barrier fluid can flow around the retaining pins 250. The pins 250 operate to prevent rotation of the stationary seal ring 14 within the outer gland plate 36.

Figure 5C:
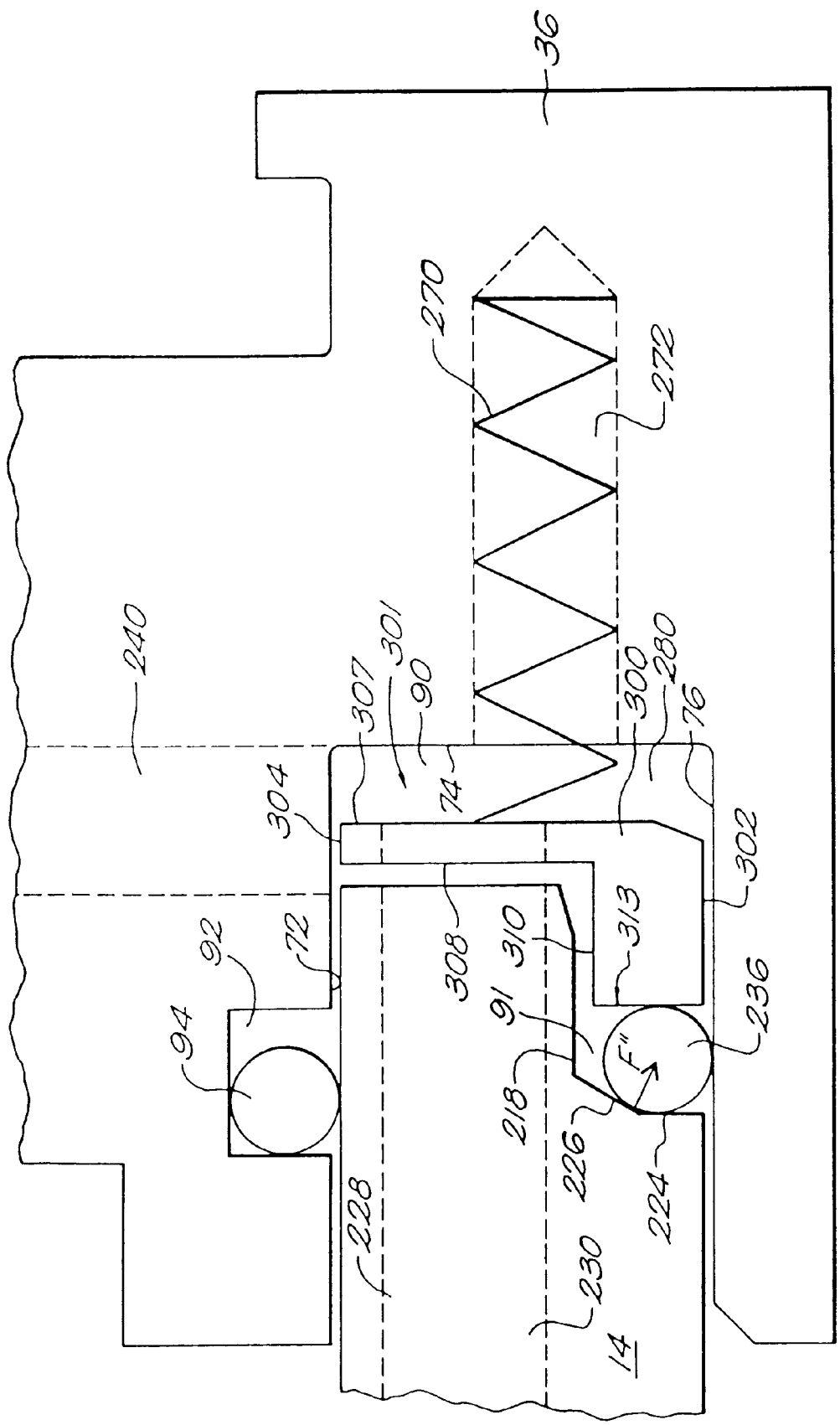
FIG. 5C is a partial side elevational view in cross-section of the outer gland plate of FIG. 5 showing the stationary seal ring and a second embodiment of the compression plate seated within the outer gland plate.

With reference to FIGS. 1, 2, 5B, 5C, 10 and 10A, a secondary sealing assembly 301 is provided and is mounted on the backside of the stationary sealing ring 14 within the closing fluid chamber 280. The secondary sealing assembly 301 forms a fluid seal between the outer gland plate 36 and two fluid environments, a process fluid chamber 290 and an ambient fluid chamber 295, as best illustrated in FIG. 1. The secondary seal assembly 301 permits axial movement of the stationary seal ring 14 when under pressure while concomitantly preventing leakage of fluid between the process fluid chamber 290, the ambient fluid chamber 295, and the closing fluid chamber 280. The secondary sealing assembly 301 includes one or more, and preferably a plurality, of mechanical springs 270, a spacer or compression plate 300, and the elastomeric member 236. The springs 270 are disposed within spring bores 272 formed within the outer gland plate 36, as illustrated in FIGS. 1, 5B, and 5C. The mechanical springs 270 abut the compression plate 300 which in turn abuts elastomeric member 236.

The mechanical springs 270 function to provide an axial force, through the compression plate 300 and the elastomeric member 236, for resiliently supporting the stationary seal ring 14 to bias the stationary seal ring such that the stationary and rotating seal faces 18 and 20 are biased towards each other. As illustrated in FIG. 1, the seal ring 14 is floatingly and non-rigidly supported in spaced relation relative to the rigid walls and faces of the gland plates. This floating and non-rigid support and spaced relationship permits small radial and axial floating movements of the stationary seal ring 14 with respect to the gland, while still allowing the rotary seal face 20 to follow and to be placed into a sealing relationship with stationary seal ring face 18.

Figure 10A:
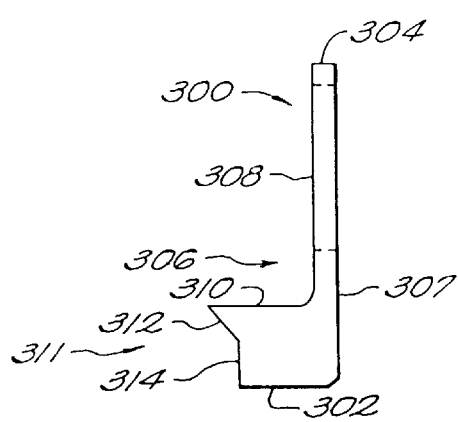
FIG. 10A is a side elevational view of the compression plate of FIG. 10.
Figure 10:
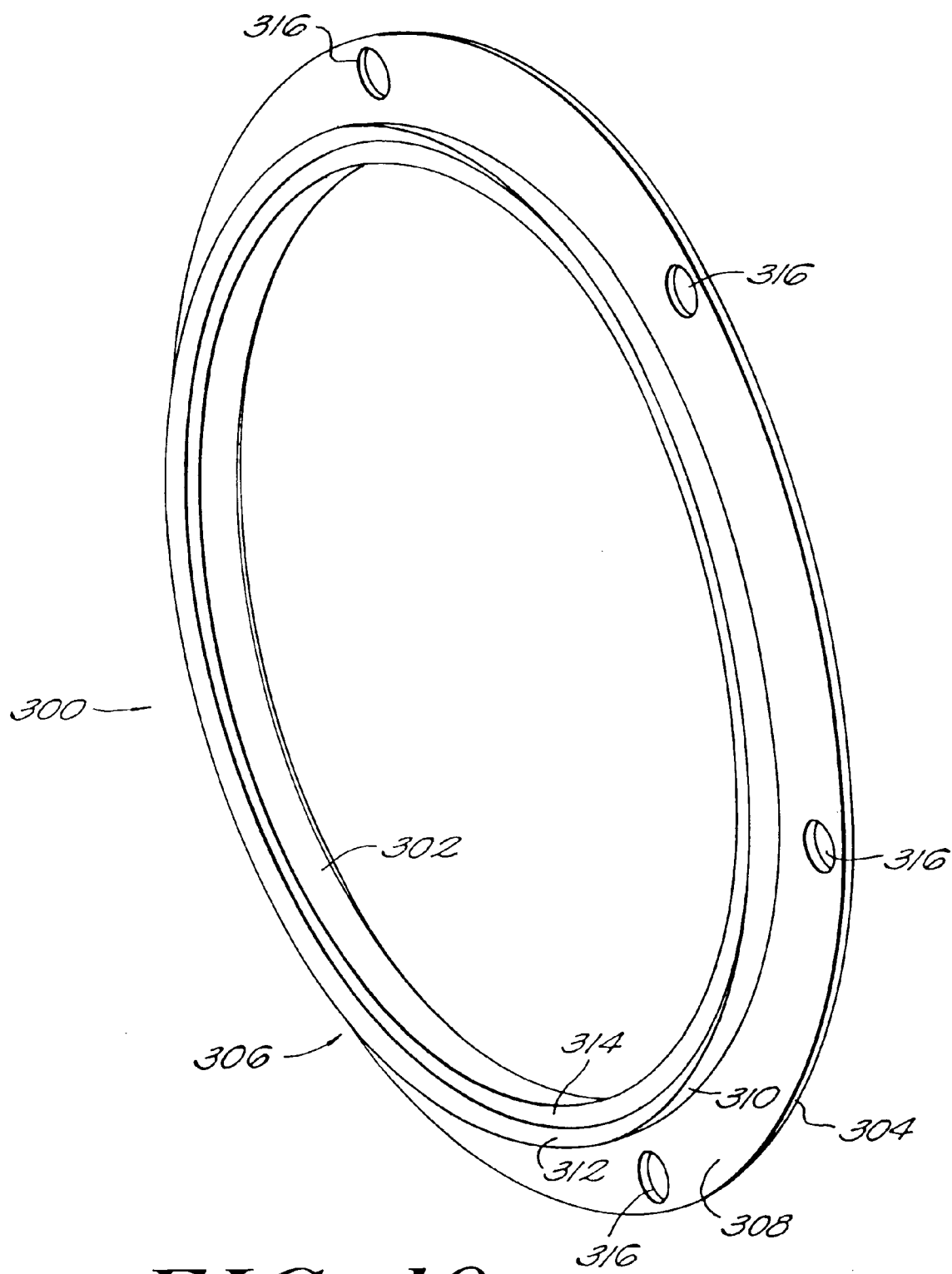
FIG. 10 is a perspective view of the compression plate of the non-contacting mechanical face seal of FIG. 1 according to the teachings of the present invention.

The compression plate 300 includes an inner radial surface 302 and an outer radial surface 304, as best illustrated in FIGS. 5B, 10 and 10A. The diameter of the outer surface 304 of the compression plate 300 is preferably less than the diameter of the first surface 72 of the outer gland plate 36. It is also preferable for the diameter of the inner surface 302 of the compression plate to be greater than the diameter of the second surface 76 of the outer gland plate 6. The compression plate 300 further includes a front surface 306 and a rear surface 307. The front surface 306 has a radially extending first front surface 308. A connecting wall 310 extends axially between the first front surface 308 and a multi-angled or beveled second front surface 311. The connecting wall 310 and the first front surface 308 form a generally right angle therebetween.

An elastomeric member receiving chamber 91 is formed by the radially extending section 224, beveled section 226, and the inner section 218 of the stationary seal ring; the multi-angled front surface 311 of the compression plate 300; and the gland plate second surface 76, as best illustrated in FIG. 5B. The chamber 91 is sized to accommodate the elastomeric member 236 without requiring an overly tight or compressive fit between the stationary seal ring 14 and the gland 30. Specifically, the elastomeric member receiving chamber 91 is sized to allow for the thermal expansion of the elastomeric member 236 without a significant increase in the compressive force on the elastomeric member, particularly the radial inward component of the compressive force. Preferably, the chamber 91 is dimensioned larger than the pre-compression or pre-stressed (i.e. relaxed) cross-sectional area of the elastomeric member 236.

The increased size of chamber 91 relative to the elastomeric member 236 avoids excessively compressing or squeezing the elastomeric member in a manner that could produce large frictional forces between the elastomeric member 236 and the outer gland plate surface 76. Particularly, the configuration of the chamber 91 allows the elastomeric member 236 to expand radially outward, i.e. in the direction of the inner section 218 of the stationary seal ring, when subjected to thermal stress during the operation of the seal. The freedom of expansion in the radial direction inhibits significant increases in compressive forces on the elastomeric member 236, particularly in the radial direction, during operation of the seal. Thus, the radial inward force on elastomeric member 236 that seats the elastomeric member against the surface 76 of the outer gland plate remains substantially constant during the operation of the seal. This in turn permits the axial frictional force between the elastomeric member 236 and the outer gland plate surface 76 to also be maintained at a substantially constant value during operation, because the magnitude of the axial frictional force is dependent on the magnitude of radial inward force on the elastomeric member. The elastomeric member 236 is thus not pre-disposed to frictionally "hanging up" axial motion of the stationary seal ring 14.

Continuing to refer to FIG. 5B, the multi-angled front surface 311 of the compression plate 300 is a contacting surface which directly biases the elastomeric member 236 into sealing contact with the outer gland plate 36 and the stationary seal ring 14, and includes a plurality, preferably two, angled surfaces 312 and 314. The angled surfaces 312, 314 are transverse to each other and arranged to form an oblique angle or a right angle, and preferably an obtuse angle. The front surface 314 extends radially between the front inner surface 302 and the second front surface 312. According to a preferred practice, the angled front surfaces 312 and 314 directly abut the elastomeric member 236 when the compression plate 300 is seated within the closing fluid chamber 280. Retaining pin bores 316 are formed in the compression plate 300 to permit the stationary seal ring retaining pins 250 to pass therethrough. The illustrated assembly and configuration of the compression plate 300 eliminates the need for a second resilient or compliant component to help bias the elastomeric member in a selected direction to attain a desired compression.

The mechanical springs 270 are coupled to the rear surface 307 of the compression plate 300 to axially bias the compression plate into contact with the elastomeric member 236, as best illustrated in FIG. 5B. The springs 270, through the plate 300, provides a closing force on the stationary seal ring that urges the stationary seal ring 14 toward the rotary seal ring 16. The angled front surfaces 312 and 314 combine to impart a selected compression force F on the elastomeric member 236 to place the elastomeric member 236 into sealing engagement with both the stationary seal ring surfaces 224, 226 and 218 and the outer gland plate surface 76. The angled front surfaces 312 and 314 of the compression plate 300 generate the compression force F having an axial component which acts to bias the elastomeric member 236 into sealing contact with the stationary seal ring 14 and a radial component which acts to bias the elastomeric member 236 into sealing contact with the outer gland plate 36. A resultant compression force F' is further imparted upon the elastomeric member 236 by the beveled surface 226 and the radially extending surface 224 of the stationary seal ring 14. Preferably, the angle of the front surface 312 to the front surface 314, as well as the angle of the surface 226 to the surface 224 of the stationary seal ring 14, is such that the magnitude of the radial force imparted to the elastomeric member 236 is sufficient to sealingly seat the elastomeric member against the outer gland plate surface 236 without producing excessive axial friction or drag forces between the elastomeric member 236 and the outer gland plate. By limiting the drag forces between the elastomeric member 236 and the outer gland plate surface 236 mechanical hysteresis or O-ring hysteresis of the elastomeric member is inhibited. In this manner, a fluid-tight and a pressure tight seal can be maintained between the stationary seal ring 14 and the outer gland plate 36 under a wide range of operating conditions, without unduly limiting the axial motion of the stationary seal ring 14.

A significant advantage of the secondary sealing assembly 301 is that the elastomeric member 236 can seat against the stationary seal ring 14 and the outer gland plate 36 without developing large frictional forces between the elastomeric member and the gland plate that can inhibit axial motion of the stationary seal ring, while concomitantly maintaining sealing between the stationary seal ring and the outer gland plate. Additionally, the secondary seal assembly reduces the number of seal components necessary to create an axial biasing force on the stationary seal ring 14. For example, the secondary sealing assembly does not require additional compliant parts that act in connection with a compression plate to squeeze the O-ring to form the appropriate fluid seal.

An alternative embodiment of the compression plate 300 is illustrated in FIG. 5C, in which the front surface 313 extends radially between the inner surface 304 and the connecting wall 310. In this embodiment, the front surface 313 of the compression plate imparts a primarily axial compression force on the elastomeric member 236. The beveled surface 226 and the radially extending surface 224 of the stationary seal ring 14 in turn impart a compression force F" that acts to place the elastomeric member 236 into sealing engagement with both the outer gland plate surface 76. The resultant compression force F" includes an axial component and a radial component which acts to bias the elastomeric member 236 into sealing contact with the outer gland plate 36 in a manner analogous to the first embodiment of the compression plate 300, described above. Alternatively, the compression plate can be provided with two angled front surfaces and the stationary seal ring can be configured to include only a single radially surface for contacting the elastomeric member. In such an embodiment, the angled front surfaces on the compression plate would impart both a radial and an axial compression force on the elastomeric member.

In addition to the mechanical biasing provided by the mechanical springs 270, an additional fluid biasing system is provided in the seal 10 of the present invention. With reference to FIGS. 1, 5A and 5B, the fluid biasing system includes the radially extending fluid bore 240 which introduces barrier fluid to the rear surface 220 of the stationary seal ring 14 to provide a closing force on the stationary seal ring 14. A fluid-tight and pressure-tight annular closing fluid chamber 280 is formed between elastomeric members 94 and 236, the rear surface 220 of the stationary seal ring 14 and the third axially extending surface 74 of the outer gland plate 36.

Figure 14A:
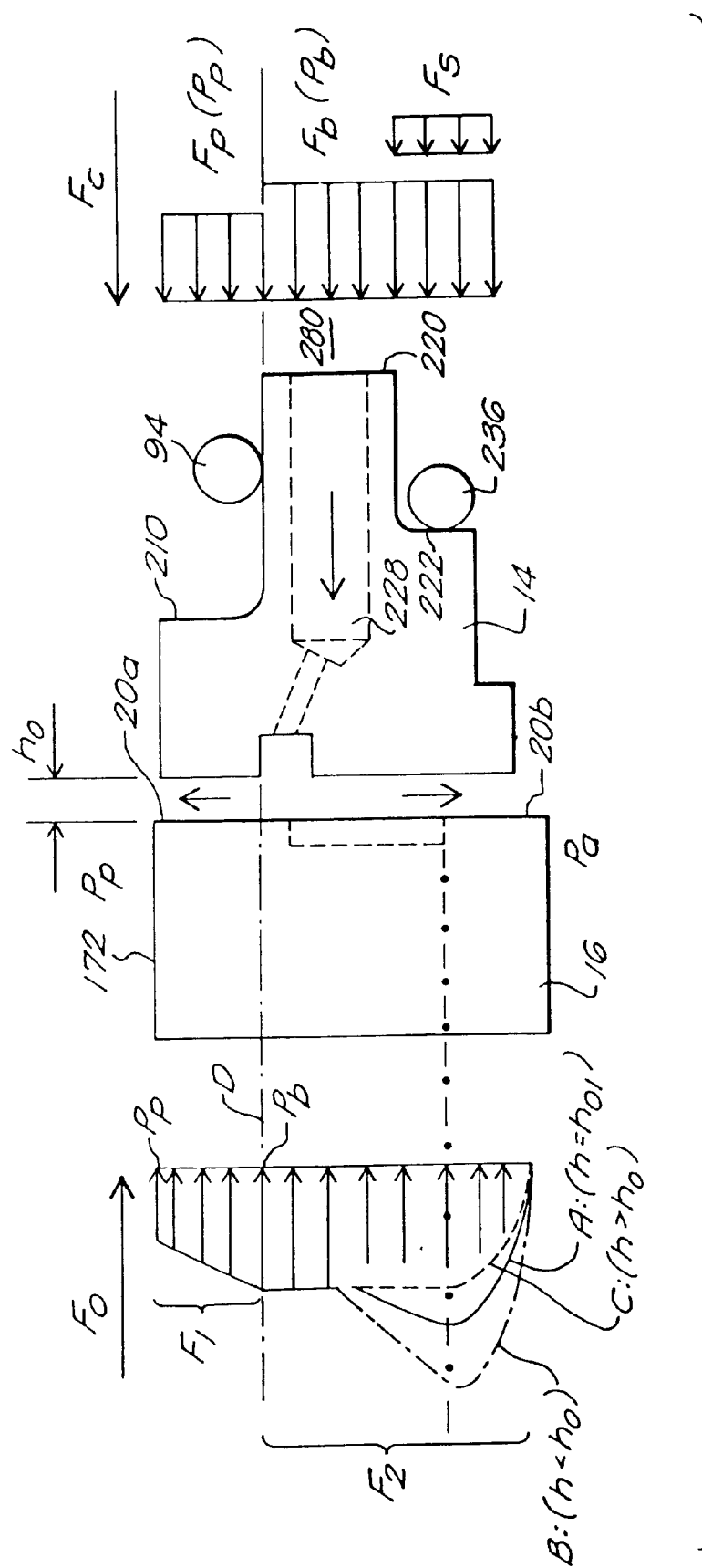
FIGS. 14A and 14B are side elevational, diagrammatic views in cross-section of the rotary and stationary seal rings of the non-contacting mechanical face seal of FIG. 1, illustrating the various forces acting on the seal rings according to the teachings of the present invention.

As best illustrated in FIGS. 5B and 14A, a closing fluid at a regulated pressure is provided from a fluid supply (not shown) to a closing fluid chamber 280 through input fluid bore 240. The fluid is preferably a gas. The fluid within the chamber exerts a fluid closing force $F_b$ on the stationary seal ring. The fluid closing force $F_b$ operates in combination with the mechanical spring closing force $F_s$, and a process fluid force $F_p$, due to the process fluid pressure acting upon the first annular connecting wall 210 of the stationary seal ring 14, to form a combined total closing force $F_c$ to bias the seal face 18 toward the seal faces 20a and 20b in a sealing relationship. Preferably, the sum of the fluid closing force $F_b$, the mechanical spring closing force $F_s$, and the process fluid force $F_p$ balances the total separation or opening force $F_o$ formed at the seal faces to control the separation of the seal faces 18 and 20. In this manner, over separation of the seal faces, which can potentially result in excessive fluid leakage, can be inhibited. In addition, seal face contact can be minimized at all rotation speeds to reduce frictional wear of the seal faces.

The magnitude of the fluid closing force $F_b$ can be adjusted or regulated by controlling the pressure of the closing fluid within the closing fluid chamber 280. The ability to adjust the closing force $F_b$ acting on the rotary seal ring provides for significant advantages. For instance, the magnitude of the closing force $F_b$ can be varied to maintain a sealing relationship between the seal faces 18 and 20 in the event of a change in operating conditions. In the particular embodiment described herein, the closing force is dependent upon the opening force because the barrier fluid is employed as the closing fluid. Consequently, the mechanical seal 10 in combination with a feedback system can dynamically regulate the fluid seal and/or the gap formed between the seal faces 18, 20 to control the amount of leakage during operation. A suitable feedback system is described in detail below.

The illustrated fluid biasing system, which includes the axial bore 228 and the groove 180, provides a simple integrated system that controls the amount of separation of the seal faces to regulate the fluid seal formed between the seal faces. Accordingly, the system can operate in combination with the separation or opening force $F_o$ provided by barrier fluid introduced to the seal faces 18, 20 to adjust the degree of seal face contact. Hence, the mechanical seal 10 can regulate or adjust the seal face separation, as well as the fluid seal formed therebetween, over a wide range of operating conditions. This increases the flexibility of the seal and allows the seal to be used in multiple environments.

One skilled in the art will recognize that the seal is not limited to the specific fluid closing system described herein and that alternative fluid closing system arrangements are possible. For example, separate fluid supplies can be used to supply barrier fluid to the seal faces and to supply closing fluid to the rear surface of the stationary seal ring. Those of ordinary skill will recognize that the barrier fluid, process fluid, or some other fluid can be used as the closing fluid. Furthermore, either the mechanical springs 270 or the closing fluid system can be used as the sole source of axial biasing force, eliminating the need for the other axial closing force.

Figure 14B:
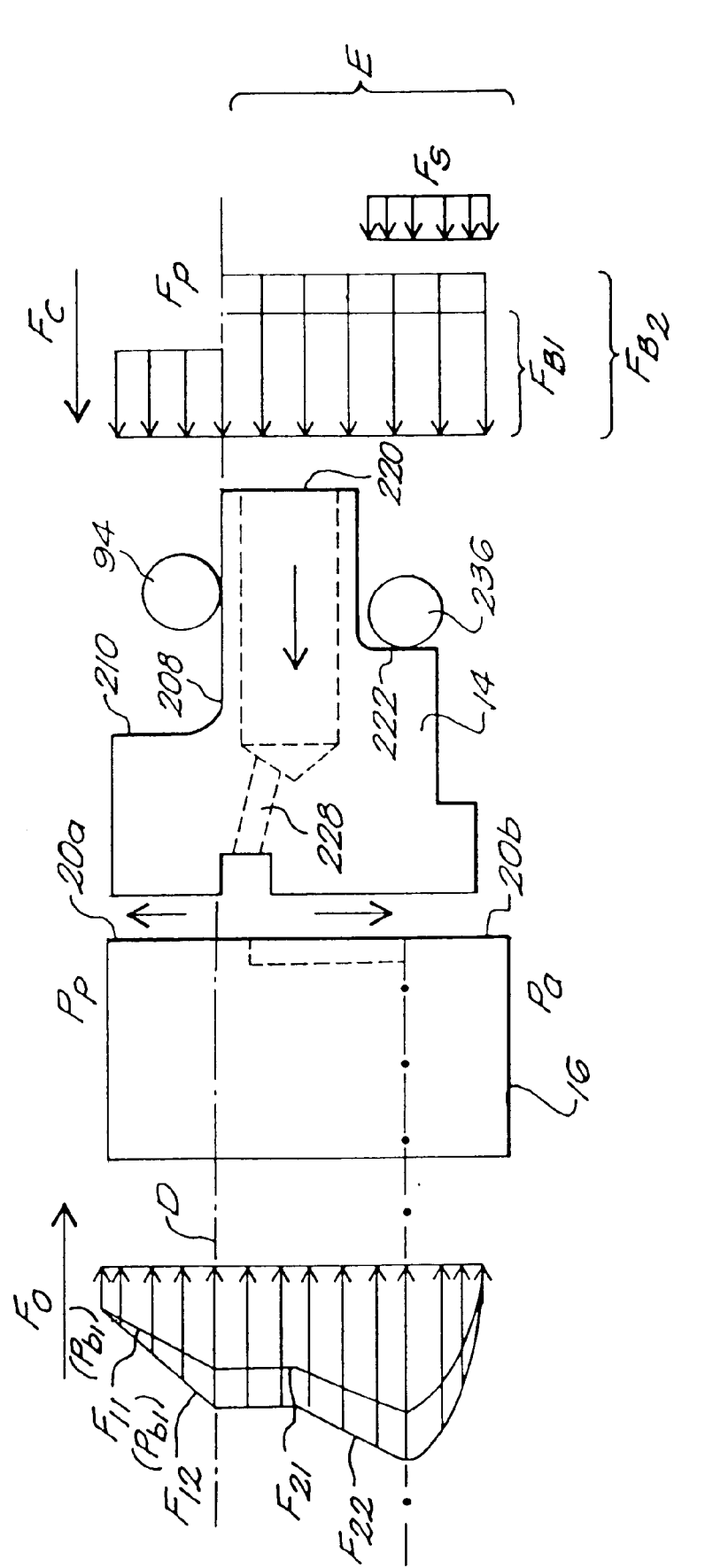

Referring to FIGS. 14A and 14B, the total opening force $F_o$ that operates in opposition to the closing force $F_c$ includes the sum of two forces: $F_1$ which corresponds to the hydrostatic force formed between concentric seal face 20a and the stationary seal ring face 18, and the force $F_2$, which corresponds to the combined hydrostatic and hydrodynamic forces formed between the seal faces 20b, when defined to include the grooves 20b, and the seal face 18. According to a preferred practice, the barrier fluid introduced to the seal faces 18, 20 through the fluid biasing system exerts a primarily hydrostatic lifting force, $F_1$, on the first seal face 20a, as well as on the corresponding portion of the seal face 18, that operates to separate at least a portion of the stationary seal ring face 18 from at least a portion of the rotary seal ring first face 20a to form a gap $h_o$ therebetween. The magnitude of the primarily hydrostatic separation force $F_1$ acting upon seal face 20a and the seal face 18 is at least partially dependent upon the magnitude of the pressure differential between the barrier fluid pressure $P_b$ and the process fluid pressure $P_p$ across the seal face 20a. The hydrostatic separation force $F_1$ decreases from a maximum value at the outer radial edge of the spiral grooves 180, where the fluid pressure between the seal faces is equal to the barrier fluid pressure $P_b$, to a minimum value at the outer radial edge of the rotary seal, e.g., at the intersection of the first seal face 20a and the outer surface 172. At this point, the fluid pressure between the seal faces is equal to the process fluid pressure $P_p$. The force $F_1$ acts upon the areas of the seal faces that overlap the first connecting wall 210 of the stationary seal ring 14, i.e., the annular seal face portion that extends radially outward from line D. The hydrostatic separation force $F_1$ is independent of, and thus does not change as a function of, the speed at which the shaft 12 and thus the rotary seal ring 16 rotates.

The barrier fluid introduced through the axial bore 228 to the grooves 180, and thus to the seal faces 18, 20, exerts a hydrodynamic lifting force $F_2$ thereon. The force $F_2$ acts upon a portion of the concentric seal face 20b, when defined to include the grooves 180, as well as on the corresponding portion of the seal face 18, to separate at least a portion of the stationary seal ring face 18 from at least a portion of the rotary seal ring second face 20b to form a gap therebetween. The lifting force $F_2$ includes both hydrostatic and hydrodynamic components. The magnitude of the separation force $F_2$ acting upon the second seal face 20b and on the seal face 18 is dependent upon at least two factors: the pressure differential between the barrier fluid pressure $P_b$ and the ambient fluid pressure $P_a$ across the seal face 20b (the hydrostatic component); and the velocity at which the rotary seal ring seal face 20b rotates relative to the stationary seal ring face 18, i.e., the shaft rotation speed (the hydrodynamic component). The primarily hydrostatic lifting force $F_1$ and the combination hydrostatic and hydrodynamic lifting force $F_2$ combine to produce the opening force $F_o$ on the seal faces 18 and 20.

The gap formed by the opening force $F_o$ is maintained at a predetermined thickness $h_o$, or is adjustable, to both minimize leakage across the seal faces and separate the seal faces to reduce wear, as illustrated in FIG. 14A. The predetermined gap thickness $h_o$ is maintained by the unique balancing system provided by the seal 10 of the present invention in which the opening force $F_o$ on the seal faces 18 and 20 is balanced by the closing force $F_c$. The closing force $F_c$ includes the process fluid force $F_p$, which acts upon the first connecting wall 210 of the stationary seal ring 14; the barrier fluid closing force $F_b$, which acts upon the rear surface 220 and the second connecting wall 222 of the stationary seal ring 14; and the mechanical spring closing force $F_s$, which also acts upon the second connecting wall 222 of the stationary seal ring 14.

During operation, the opening force $F_o$ is balanced by the closing force $F_c$ to maintain the gap at a preferred standard thickness $h_o$. The magnitude of the lifting force $F_2$ on the second seal face 20b when the gap is at the preferred thickness $h_o$ is illustrated by solid line A in FIG. 14A. The curved portion of the line A represents the hydrodynamic component of the lifting force $F_2$, and has a maximum value that corresponds to the location of the highest pressure fields within the groove 180. If a change in operating conditions results in the thickness h of the gap decreasing below the preferred value $h_o$ (h<ho), represented by alternately dashed line B, the balancing arrangement of the seal 10 of the present invention compensates by returning the gap to the preferred value $h_o$. This occurs since a decrease in the gap thickness results in an increase in the hydrodynamic component of the lifting force $F_2$, as illustrated by line B. The resulting increase in the lifting force $F_2$ causes the seal faces to separate until the preferred gap thickness $h_o$ is again reached.

Likewise, if a change in operating conditions results in the thickness h of the gap increasing above the preferred value $h_o$ (h>$h_o$), the balancing arrangement of the seal 10 of the present invention compensates by returning the gap to the preferred value $h_o$. Specifically, the increase in the gap thickness results in a decrease in the hydrodynamic component of the lifting force $F_2$, as illustrated by dashed line C in FIG. 14A. The resulting decrease in the lifting force $F_2$ causes the seal faces to come together until the preferred gap thickness $h_o$ is again reached.

Additionally, the mechanical seal 10 of the present invention allows for the adjustment of the degree or elimination of direct, frictional contact between the seal faces, independent of shaft rotational speed, by adjusting the barrier fluid pressure, and thus the magnitude of the hydrostatic lifting force F1, to produce the desired separation gap.

FIG. 14B illustrates the ability of the mechanical seal 10 to adjust, regulate, or change the opening force $F_o$ as a function of the difference between the pressure of two system fluids, for example, the difference between the barrier fluid pressure $P_b$ and the process fluid pressure $P_c$. Additionally, the effects of increasing the closing fluid pressure on the stationary seal ring of the mechanical seal 10 during low speed shaft rotation is also shown. As illustrated, increasing the barrier fluid pressure from $P_{b1}$ to $P_{b2}$ results in a corresponding increase in the closing force $F_c$ along the portions of the stationary seal ring that are exposed to the closing fluid. designated as E. The closing force portion $F_p$ does not increase along the outer radial portion of the stationary seal ring 14, which corresponds to the first connecting wall 210, since the O-ring 94 isolates that outer portion of the stationary seal ring from the closing fluid and thus is only exposed to the process fluid pressure.

The increase in barrier fluid pressure from $P_{b1}$ to $P_{b2}$ within the grooves 180 and thus between the seal faces 18, 20 results in an increase in the opening force $F_o$ along the entire radial surface of the seal faces, as illustrated in FIG. 14B by the force lines $F_{11}$ and $F_{21}$, which correspond to the initial barrier fluid pressure $P_{b1}$, and by the force lines $F_{12}$ and $F_{22}$, which correspond to the increased barrier fluid pressure $P_{b2}$. The increase in the opening force from F21 to F22 in the hydrodynamic and hydrostatic region of the seal (e.g., other than from line D to the outer diameter of the seal rings) generally corresponds to the increase in closing pressure from Fb1 to Fb2, However, the increase in opening force from F11 to F12 is not offset by a corresponding increase in the closing force of Fp. More particularly, the portion of the increased primarily hydrostatic lifting force $F_{12}$ applied to the seal face 20a and that portion of seal face 18 that is radially aligned with the first connecting wall 210 of the stationary seal ring 14, is not balanced by a corresponding increase in the closing force. This occurs because the first connecting wall 210 of the stationary seal ring 14 forms part of the process fluid chamber 295 and as such is exposed solely to the process fluid, and not to the barrier fluid. This unique arrangement thus allows for the opening force $F_o$ only to be increased along the outer radial portion of the seal faces, e.g., from line D to the outer diameter of the seal rings, solely by increasing the barrier fluid pressure. Since this portion corresponds to the hydrostatic region along concentric seal face 20a, the increased opening force is independent of shaft rotation speed.

Figure 15:
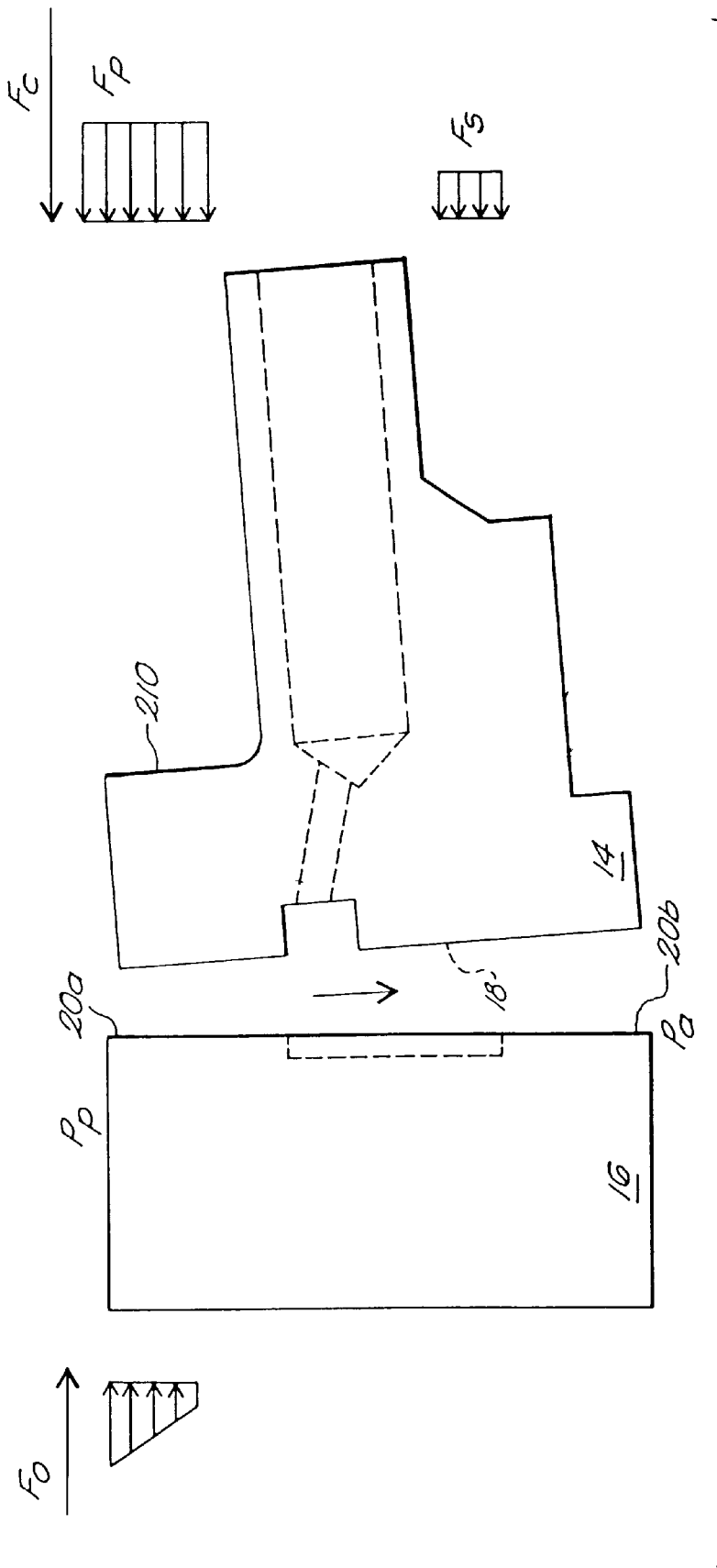
FIG. 15 is a side elevational, diagrammatic view in cross-section of the rotary and stationary seal rings of the non-contacting mechanical face seal of FIG. 1, illustrating the various forces acting on the seal rings during a loss of barrier fluid pressure condition according to the teachings of the present invention.

Another advantage of the illustrated seal 10 is that it can continue to operate even when a loss of barrier fluid pressure supplied to the seal faces 18, 20 occurs, as illustrated in FIG. 15. A hydrostatic opening force $F_o$ is generated between the seal face 18 and 20a due to the pressure difference between the process pressure $P_b$ and the ambient pressure $P_a$. The hydrostatic opening force Fo is opposed by a closing force $F_c$ composed of a process fluid force component $F_p$ and a spring force component $F_s$. The spiral grooves no longer produce a hydrodynamic lifting force because of the absence of barrier fluid within the grooves. The relatively large pressure differential that forms between the outer diameter region, which is exposed to the process fluid, and the inner diameter region, which is exposed to ambient, does not transport or pump undesirable levels of process fluid across the seal faces to the ambient side of the seal because of the fluid barrier created between the seal faces by the hydrostatic clamping force. Upon loss of barrier fluid the seal thus operates as a partial contact liquid seal.

The mechanical seal 10 of the present invention can include a pressure feedback system that regulates either or both of the closing pressure and the pressure of the barrier fluid supplied to the seal to maintain the desired conditions at the seal faces 18, 20 of the seal rings 14, 16. The pressure control system can include pressure sensors mounted within or at the seal to monitor changes in barrier and closing fluid pressure during operation. The pressure sensors can be coupled to a controller or the like in a closed or open feedback system for adjusting the barrier and/or closing fluid pressure in response to pressure variations due to changes in operating conditions. Examples of pressure feedback systems are disclosed in U.S. Pat. No. 2,834,619 and U.S. Pat. No. 3,034,797, both of which are incorporated herein by reference.

Alternatively, a pressure feedback system can employ one of the system fluids, such as barrier, process or closing fluid, as a regulator fluid input and regulate either the barrier fluid pressure or closing force based on this regulated input. In doing this, the pressure feedback system can sense a change in pressure between selected fluid pressures and corrects any imbalance. The pressure feedback system accomplishes this correction by connecting the system to a high pressure fluid supply to add fluid to the system to raise the pressure therein or to vent pressure from the system when internal pressure is above a selected value. Such pressure feedback systems 400 are illustrated in FIGS. 12 and 13.

Figure 12:
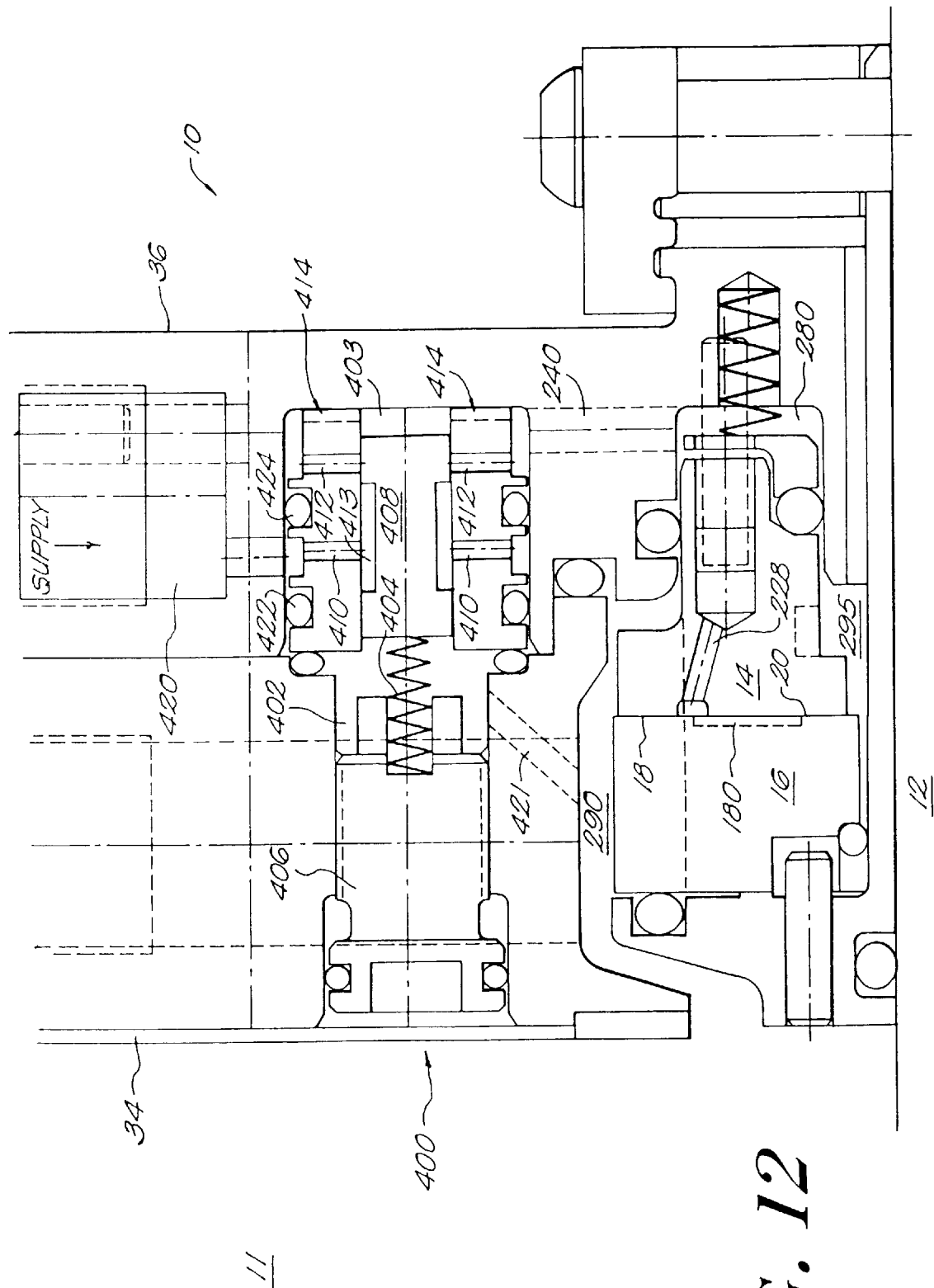
FIG. 12 is a fragmentary view in cross-section of the non-contacting mechanical face seal of FIG. 1 of the invention with a pressure feedback system mounted within the gland.
Figure 13:
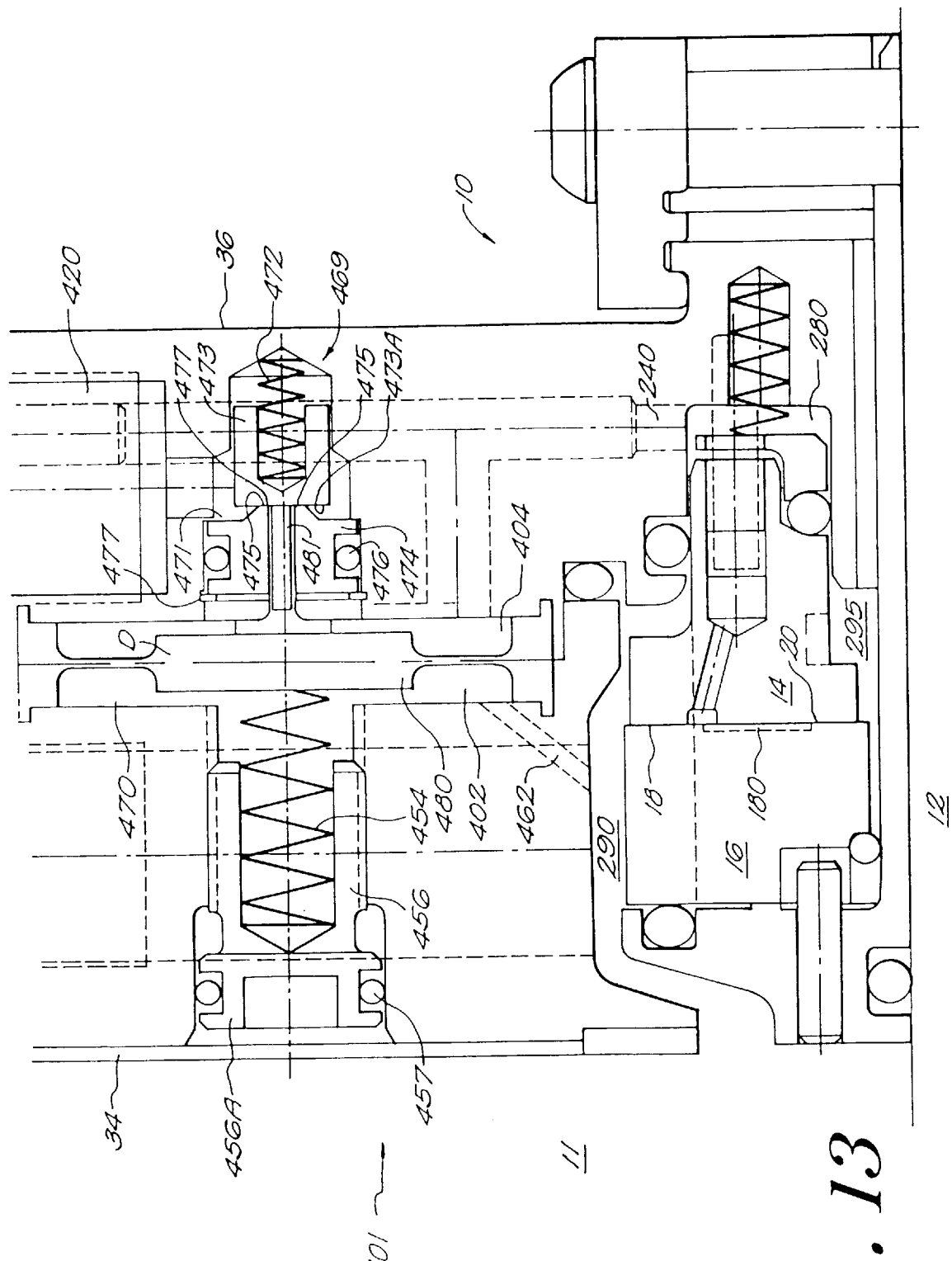
FIG. 13 is a fragmentary view in cross section of the non-contacting mechanical face seal of FIG. 12 employing an alternate embodiment of the pressure feedback system.

FIG. 12 illustrates one embodiment of a fluidic feedback pressure regulating system 400 suitable for use with the mechanical seal 10. The feedback system 400 is preferably employed to regulate a system fluid based on the pressure of another system fluid. According to one practice, the system initially sets the barrier fluid pressure at a selected level relative to the process pressure by a selected amount corresponding to a spring pressure. The barrier pressure is then employed as a system output regulated fluid that operates as a system fluid sensor to selectively add a closing fluid to the system 400. The regulated closing fluid corresponds to the closing fluid contained in the closing fluid biasing system discussed above.

The illustrated feedback system 400 is preferably sized and dimensioned for mounting within the inner and outer gland plates 34 and 36. The system is coupled to the seal 10, whose components have been previously described. Therefore, like reference numerals designate like parts. The stationary seal ring 14 includes axial bore 228 that communicates at one end with stationary seal face 18 and at the other end with a barrier fluid source. The rotary seal ring 16 has a pumping groove 180 formed therein and which is positioned to directly fluidly communicate with the axial bore 228. The groove and axial bore operate to channel a barrier fluid directly to the seal faces, between which a hydrodynamic lifting force is created that separates the faces to form a gap therebetween.

The illustrated feedback system 400 employs a movable differential pressure valve 408 disposed within an appropriately sized chamber formed within the glands 34 and 36. The movable valve 408 can include a number of different valves including, but not limited to, spool or shuttle valves, poppet valves, needle valves, diaphragms, bellows, and other like movable valves that are capable of conveying or being acted upon by a pressurized fluid. The chamber mounts an annular fluid manifold 414 that is bored in a selected manner to allow communication between the various pressure passages and bores of the fluidic feedback pressure regulating system. The illustrated fluid manifold 414 has a central bore that seats the movable valve 408. The bore is sized slightly larger than the outermost diameter of the movable valve to allow relatively free axial movement of the valve within the bore between open and closed positions. The fluid manifold 414 includes a number of radially extending fluid bores 410 and 412 to allow the manifold to selectively communicate a particular pressurized fluid to the gland chamber. Sealing structures such as O-rings 422 and 424 are mounted within corresponding grooves formed in the outer surface of the manifold to form a pressure and fluid seal between the inner walls of the chamber and selected portions of the fluid manifold 414.

The movable valve 408 divides the chamber into an input fluid chamber 402 and an output fluid chamber 403, with an intermediate chamber 413 formed between the flanged end portions of the valve. The valve 408 is coupled to an adjustable spring 404, one end of which is attached to a manually adjustable screw 406. The illustrated adjustable screw 406 is mounted in a limited access location to prevent or inhibit personnel from tampering with or adjusting the spring tension from a factory pre-set setting. If necessary, the system operator can adjust the spring tension by accessing and then turning the screw in a selected manner. The screw 406 and the spring 404 thus act in combination to help define an initial or set point pressure for the illustrated pressure regulation subsystem 400.

The screw 406 and spring 404 extend into the input fluid chamber 402 from the interior surface of the gland. The input fluid chamber 402 can communicate with a process fluid distribution network to allow the process fluid of the seal to communicate with the input regulation chamber 402, as designated. The process fluid distribution network of the fluidic feedback pressure regulation system 400 can include, among other structure, appropriate process fluid chambers formed within or about the mechanical seal, such as process fluid chamber 290 and process fluid bore 421 (shown in phantom) that communicates the process fluid from the chamber 290 to the input fluid chamber 402. Those of ordinary skill will recognize that the process fluid distribution network can include that collection of internal bores and passages formed within the gland to enable the process fluid to communicate, if desired, with the movable valve 408 in a selected manner. The regulation system can also employ couplings external of the gland to communicate system fluids with particular portions or components of the system. For example, external fluid conduits can be connected to the gland to transfer the process fluid from the fluid housing to the input process fluid bore 421.

With further reference to FIG. 12, the fluidic feedback pressure regulation system 400 can also include a barrier fluid distribution network that communicates barrier fluid from a high pressure barrier fluid supply (not shown) to the fluid manifold 414. The barrier fluid distribution network can include appropriate barrier fluid passages that communicate the barrier fluid from the gland chamber to a separate portion of the seal, including to the barrier fluid biasing system, i.e., axial bore 228 and groove 180, to other feedback systems that can be mounted within the gland, and to other fluid passages/bores such as fluid supply 420 and barrier passage 430. The movable valve 408 defines an intermediate chamber or channel 413 which can communicate with a barrier fluid source through input supply bore 420 and input chamber bore 410. The intermediate chamber 413 is also selectively disposed in fluid communication with the barrier fluid distribution network by way of output barrier bores 412 and 240.

During operation, the process fluid from the housing 11 communicates with the input chamber 402 through the process fluid distribution network. According to one practice, the process fluid is directed from the process chamber 290 to the input chamber 402 through the input process pressure bore 421. The process fluid is at a given operating pressure. The process fluid in the input fluid chamber 402 exerts a pressure on the input side, e.g., the left side, of the movable valve 408. In addition, the adjustable spring 404 exerts a pressure on the movable valve 408. The combination of these two forces or pressures forms the input pressure, which exerts an initial input axial force that biases the movable valve 408 to the right.

The barrier fluid source introduces the barrier fluid to the fluidic feedback pressure regulating system and to the mechanical seal by the barrier fluid distribution network. The barrier fluid from the barrier fluid source is selectively introduced through the input supply passage 420 to the input barrier bore 410 and into the intermediate chamber 413. The barrier fluid is then selectively introduced to the output chamber 403 by selectively biasing the movable valve 408 between open and closed positions. The valve 408 is illustrated in the closed position.

The barrier fluid housed in the output fluid chamber 403 exerts an opposite or axially inward pressure against the right side of the movable valve 408 to form an output pressure. When the output pressure exerted by the barrier fluid is less than the sum of the process fluid pressure and the adjustable spring pressure, the differential pressure valve 408 moves to the right into the open position. This enables the intermediate chamber 413 to communicate with the output barrier bore 412 to provide a fluid pathway from the barrier fluid supply through the fluid supply conduit to the output fluid conduit 412. The barrier fluid then passes through the passage 240 into the axial bore 228, and hence to the remainder of the barrier fluid distribution network. The passage 240 further pressurizes the closing chamber 280.

As the barrier fluid distribution network fills with barrier fluid from the supply source, the barrier fluid pressure in the output fluid chamber 403 increases until the pressure equals or exceeds the sum of the pressures exerted by the process fluid and the adjustable spring 404. When this occurs, the valve 408 is biased into the illustrated closed position to disconnect the barrier fluid supply from the output barrier passage 240. The barrier fluid within the fluidic feedback pressure regulation system is thus pressurized to a level equal to about the sum of the pressures exerted by the process pressure and the variable pressure of the spring 406.

The illustrated system 400 can further include a subsystem for venting the closing fluid from the closing fluid network. The subsystem can include most of the same components as the illustrated subsystem 400, except for the process fluid bore 421 and the barrier fluid bore 240. The subsystems can thus be utilized together or in any combination to control a particular fluid pressure that acts upon, either directly or indirectly, the seal faces 18 and 20. The illustrated subsystem 400 can also be employed to selectively connect a closing fluid supply (not shown) to the closing force biasing system of the seal independent of the barrier fluid system. The closing fluid system applies a closing force to the backside of the stationary seal as a function of the pressure within the barrier fluid distribution network and/or the barrier fluid biasing system, e.g., the axial bore 228 and groove 180.

The closing fluid distribution network of the subsystem connects the source of closing fluid to the stationary seal ring 14. The closing fluid network exerts a closing axial biasing force on the seal ring 14 to adjust or regulate the separation between the stationary and rotary seal rings 14, 16. The closing fluid distribution network can include any suitable arrangement and number of fluid conduits and bores that introduces the fluid to at least one of the seal rings to adjust the separation therebetween. In particular, the illustrated network can include one or more of the input closing force supply passage 420, the input closing fluid bore 410, the intermediate chamber 413, the output closing fluid bore 412, the closing fluid passage 240, and the closing fluid chamber 280. In the illustrated system 400, the barrier fluid system and the closing fluid distribution network share many of the same passages/bores. Consequently, a discrete and dedicated series of fluidly connected passages can be employed to simultaneously pressurize the barrier fluid system and closing fluid network. According to a preferred practice, the closing fluid can be any suitable barrier fluid.

FIG. 13 illustrates another embodiment of the fluidic feedback pressure regulation system 401 of the present invention. The illustrated system 401 employs a diaphragm D as the movable valve. According to one practice, the system 401 preferably disposes the input barrier fluid pressure at a selected level relative to the process fluid pressure and the pressure provided by the spring 454, while concomitantly adding a closing fluid to the system. The operation and function of the illustrated system 401 is similar to the operation of the feedback regulating system 400 of FIG. 12. Like reference numerals refer to similar parts in the Figures.

The gland plates 34 and 36 are bored to form a pair of chambers 470 and 471 that are axially spaced from each other. The chambers are selectively disposed in fluid communication with each other. The diaphragm D is sized and dimensioned to mount within the chamber 470 and divides the chamber into an input fluid chamber 402 and an output fluid chamber 403. The diaphragm D has a bellows portion 480 and an axially extending spindle portion 481 that has a central bore which is open at both ends. The illustrated diaphragm D is coupled to a spring 454, one end of which is attached to a manually adjustable screw 456. The screw 456 includes a head portion 456A which is mounted along the inner surface of the gland at a limited access location. An annular O-ring 457 mounts about the head 456A in a groove to provide a fluid seal between the external environment and the chamber 470. The screw variably adjusts the tension of the spring to either increase or decrease the tension and therefore the pressure of the spring, while concomitantly increasing the pressure within the input chamber 402. The screw 456 and the spring 454 thus act in combination to define the initial or set point pressures in the illustrated pressure regulation subsystem 401. The limited access location of the screw inhibits or prevents a system operator from adjusting the spring tension, which can be pre-set to a selected tension at the factory. Those of ordinary skill will also recognize that the manually adjustable screw 456 can be mounted along the outer surface of the gland.

The screw 456 and spring 454 extend into the input fluid chamber 402 from the axial inner surface of the inner gland plate 34. The input fluid chamber 402 communicates with a process fluid distribution network to allow the process fluid of the seal to communicate with the input chamber 402. The process fluid distribution network of the fluidic feedback pressure regulation system can include appropriate process fluid chambers formed within or about the mechanical seal, such as process fluid chamber 290, and input process fluid passage 462 (shown in phantom) that communicates the process fluid from the chamber 290 to the input fluid chamber 402. Those of ordinary skill will recognize that the process fluid distribution network can include any suitable collection of internal bores and passages formed within the gland that enables the process fluid to communicate with the diaphragm in a selected manner. The regulation system can also employ couplings external of the gland to communicate system fluids with particular portions or components of the system. For example, external fluid conduits can be connected to the gland to transfer the process fluid from the fluid housing to the input process fluid bore 462. In an alternate embodiment, the gland can be internally bored to allow the process fluid to communicate with the process fluid bore completely within the gland without the use of external fluid couplers.

The chamber 471 is formed axially outward relative to the chamber 470. The chamber 471 further communicates on one side with the input fluid supply passage 420. The chamber 471 mounts a spring biasing assembly 469 having a spring 472, an intermediate plate 473 having a U-shaped cross-section, and a fixed annular sealing plug 474. One end of the spring 472 seats at the axially outermost portion of the chamber 471, the other end of which seats within a recess formed in the plate 473. The intermediate plate 473 has a sealing surface 473A that abuts a seating surface 475 formed on one end of the sealing plug 474. The sealing plug 474 has an annular groove that mounts an O-ring 476 that provides a fluid seal between chambers 470 and 471. The plug preferably has a shoulder portion 477 that seats in a mating groove formed in the chamber wall to rigidly and fixedly seat the plug 474 in place. The plug has a central bore 477 that is sized to slidingly seat the spindle portion 481 of the diaphragm D. The plug operates to prevent fluid supplied to the chamber 471 from the fluid passage 420 from communicating with the output chamber 403 when the plate is in intimate facing contact with the seat 475.

The illustrated intermediate plate 473 is alternately disposable between open and closed positions by selected fluid and mechanical forces. When the spring biasing assembly 469 is disposed in the illustrated closed position, the sealing surface 473A contacts in a sealing relation with the seat surface 475 of the plug 474. This position prevents fluid contained in the chamber 471 from communicating with the output chamber 403. When the assembly 469 is disposed in the open position, the plate 473 is axially spaced from the plug 474 to allow the fluid within chamber 471 to pass through the central bore 477 into the output chamber 403.

With further reference to FIG. 13, the axial spindle 481 has an outer end that seats, in a closed position, against the sealing surface 473A of the intermediate plate 473. When disposed in an open position, the spindle disengages from the sealing surface 473A, thus allowing fluid in the output chamber 403 to communicate with the chamber 402 through the spindle's central bore.

In the illustrated system 401, the input fluid chamber 402 is fluidly connected to the process fluid chamber 290 via process fluid bore 462. The output fluid chamber 403 is fluidly connected to the barrier fluid distribution network and the closing fluid network via fluid bore 240. The fluidic feedback pressure regulating system of the invention includes a barrier fluid distribution network that communicates barrier fluid from a high pressure barrier fluid supply to the diaphragm and/or to the barrier fluid biasing network. Further, the system includes a closing fluid network that communicates a closing fluid, such as barrier fluid, to the closing fluid chamber 280.

During operation, the process fluid from the fluid housing communicates with the input chamber 402 through the input process pressure passage 462 and any other appropriately formed passageway within the seal and/or gland that enables the process fluid to enter the input chamber 402. The process fluid is at a given operating pressure. The process fluid in the input fluid chamber 402 exerts a pressure on the input side, e.g., the left side, of the diaphragm D. In addition, the adjustable spring 454 exerts a pressure on the diaphragm D. The combination of these two forces or pressures forms the input pressure, which exerts an initial input axial force that biases the diaphragm towards the right.

The barrier fluid from the barrier/closing fluid supply (not shown) is introduced to the regulation system 401 and to the mechanical seal 16 by the barrier fluid distribution network. According to one practice, the barrier fluid from the barrier fluid supply is selectively introduced to the feedback system, and in particular to the output chamber 403 through supply bore 420. Consequently, the position of the intermediate plate 473 determines whether barrier fluid is introduced to the output chamber 403. The barrier fluid housed in the output fluid chamber 403 exerts an opposite or axially inwardly pressure against the right side of the diaphragm D to form the output pressure.

When the input pressure exerted by the process fluid and the spring 406 is greater than the output pressure within the output chamber 403, the diaphragm D moves to the right, and the spindle 481 separates the plate surface 473A from the seat surface 475. The fluid supply introduces barrier fluid to the chamber 471, which then passes through the central bore 477 of the plug 474 to the output chamber 403. The barrier fluid then passes therefrom to the output passage 240 and into the axial bore 228 and the chamber 280.

As the barrier fluid distribution network fills with barrier fluid from the supply, the barrier fluid pressure in the output fluid chamber 403 increasingly exerts a pressure on the diaphragm D to force it in the opposite direction, e.g., to the left. When the barrier fluid pressure within the output chamber 403 generally equals the sum of the pressures exerted by the process fluid and the adjustable spring 454, the diaphragm D is forced to the left. The spring 472 and the intermediate plate 473, in combination with the barrier fluid pressure within the chamber 471, forces the plate sealing surface 473A back into contact with the seat 475, thereby disconnecting the fluid supply from the output chamber 403. The barrier fluid within the fluidic feedback pressure regulation system 401 is thus pressurized to a level equal to about the sum of the pressures exerted by the process pressure and the selectable pressure of the spring 454. Hence, the barrier fluid within the output chamber 403 is pressurized to a level above the process fluid by an amount corresponding to the tension or pressure of the spring 454. Those of ordinary skill will recognize that the increase in barrier fluid pressure within the output chamber 403 is indicative of low barrier pressure at the seal faces, and thus of impending seal face contact The addition of barrier fluid to the seal faces through the axial bore 228 and the groove 180 pressurizes the gap at the seal faces to separate the seal faces.

In assembly, the rotary seal ring 16 is mounted onto the sleeve 100 by aligning the drive slots 138 of the rotary seal ring with axially extending drive pins 136, which extend from drive bore 134 of the holder assembly. The centering member 170 is concentrically disposed about the sleeve and is further placed into contact with the inner surface 166 of the rotary seal ring. Likewise, the O-ring 130 is disposed within annular groove 128 formed in the sleeve 100 and is further placed in sealing contact with the rear surface 174 of the rotary seal ring 16.

The stationary seal ring 14 and the compression plate 300 are mounted within the stationary seal ring receiving chamber 90 of the outer gland plate 36 by disposing the mechanical springs 270 within spring bores 272 of the outer gland plate 36 to abut the rear surface 307 of the compression plate 300. The axial section 230 of the fluid bores 228 and the bores 316 of the compression plate 300 are aligned with the retaining pins 250 extending from the bores 252 formed in the outer gland plate 36. The O-ring 236 is concentrically disposed about the second surface 76 of the outer gland plate and is placed into sealing contact with the radial extending section 224 and beveled section 226 of the stationary seal ring 14. The surfaces 312 and 314 of the compression plate bias the O-ring 236 into sealing contact with both the stationary seal ring 14 and the outer gland plate 36. The O-ring 94 is disposed within groove 92 of the outer gland plate 36 and further placed into contact with the second outer surface 208 of the stationary seal ring 14. The O-rings 94 and 236 accordingly provide for fluid-tight and pressure-tight sealing between the outer gland plate and the stationary seal ring 14.

One skilled with the art will recognize that alternative mechanical spring arrangements are possible, including an arrangement without the compression plate 300 in which the mechanical springs directly contact the rear surface of the stationary seal ring 14.

Gland plate O-ring 56 is then mounted within gland gasket groove 70 and the outer gland plates 36, the sleeve 100, and the stationary and rotary seal rings 14 and 16 are concentrically disposed about the shaft 12. The lock ring 144 is then concentrically disposed about the outer end 104 of the sleeve 100. Screws 142 are inserted through the lock ring into fastener receiving apertures 140 of the sleeve 100. The screws 142 are tightened into frictional engagement with the shaft 12, thereby securing the sleeve 100, as well as the rotary seal ring 16, with the shaft 12.

The inner gland plate 34 is then concentrically disposed about the shaft. The flange 120 of the rotary seal ring sleeve 100 and the rotary seal ring 16 are mounted within the inner gland plate 34. As shown in FIG. 1, the rotary seal ring 16 and the flange 120 of the sleeve 100 are spaced from the inner gland plate inner surface 38, thereby permitting rotation of the sleeve 100 and the rotary seal ring 16 relative to the inner gland plate 34. The gland plates 34 and 36 are next secured together by screws 84 that are mounted in and positively maintained by fastener-receiving apertures 82 in the gland plates. The gland gasket groove 70 abuts radial extending surface 54 of the inner gland plate 34 to provide a pressure-tight and fluid-tight seal between the gland plates 34 and 36.

Prior to fully securing the gland assembly 30 to the housing 11, the shaft 12, the sleeve 100, and the stationary and rotary seal rings 14, 16 are centered within the gland assembly. An example of one type of centering mechanism is illustrated as centering clip 15, as shown in FIG. 1. Examples of other suitable centering mechanisms are described in U.S. Pat. No. 5,571,268, which is assigned to the assignee hereof and which is incorporated herein by reference.

After the seal 10 is assembled and mounted to the pump housing 11, the process medium is sealed within a process fluid chamber 290, as shown in FIG. 1. The process fluid chamber is defined by the inner gland plate inner surface 38, the outer gland plate second surface 68, O-rings 56 and 94, the outer surface of the sleeve 100, the outer surface 172 of the rotary seal ring 16, and the first and second outer surfaces 206, 208 and first connecting wall 210 of the stationary seal ring 14. The ambient medium, typically air, fills an ambient fluid chamber 295, typically sealed from the process chamber 290, that is defined by the stationary and rotary seal ring inner surfaces 162, 202, the O-rings 130 and 236 and the outer surfaces 112 and 114 of the sleeve 100. The terms "ambient" and "ambient medium" are intended to include any external environment or medium other than the process environment or process medium.

Continuing to refer to FIG. 1, the O-ring 118 prevents the seepage of process fluid along the shaft 12. The flat gasket 50 prevents the seepage of process fluid along the housing 11 and the seal 10 interface. The gland plate O-ring 56 prevents seepage of the process fluid between the gland plate interface. The O-rings 94 and 130 prevent process fluid from invading the ambient fluid chamber 295 by way of the sleeve 100 and the gland assembly 30.

In operation, barrier fluid is introduced to the spiral grooves 180 and the seal faces 18, 20a, 20b through barrier fluid bores 228 in the stationary seal ring 14. The barrier fluid fills the gap formed between the seal faces, thereby separating the seal faces 18 and 20 to form a fluid seal between the process medium in the process chamber 290 and the ambient fluid in the ambient fluid chamber 295. The gap is maintained at a predetermined thickness, or is adjustable, to minimize leakage across the seal faces while concomitantly separating the seal faces to reduce wear.

The effects of the barrier fluid on the seal 10 is twofold. First, the barrier fluid can reduce wear on the seal faces by reducing the amount of direct, frictional contact between the seal face 18 and the seal faces 20a and 20b, thus resulting in a longer life for the seal components. Second, the barrier fluid operates to minimally transfer heat generated by the direct, frictional contact between the seal faces away from the seal faces, resulting in a more even temperature distribution throughout the seal 10 and thus prolonging the useful life of the seal components by reducing thermal stress that the components are subjected to.

The barrier fluid exerts a primarily hydrostatic lifting force on the first concentric seal face region 20a, as well as on the corresponding portion of the seal face 18. The seal also develops a hybrid hydrodynamic and hydrostatic force at the grooves 180 and along the inner concentric seal face 20b. The barrier fluid exerts a lifting force on the second seal face 20b, as well as on the corresponding portion of the seal face 18, that operates to separate at least a portion of the stationary seal ring face 18 from at least a portion of the rotary seal ring face 20b to form a gap therebetween.

A significant advantage of seal 10 of the present invention is that a pair of concentric seal faces can be formed on a single seal ring, and preferably on the seal rings of a non-contacting mechanical face seal. The formation of the concentric seals forms a dual seal design employing only a pair of seal rings, although additional seal rings can be used if necessary. This forms a substantially compact mechanical seal, and preferably a compact non-contacting mechanical face seal, that mounts to existing fluid machinery in existing seal spaces, without requiring significant modification of the housing or of surrounding structure in order to accommodate the mechanical seal.

Another significant advantage of the formation of a primarily hydrostatic force along one portion of the rotary seal ring seal face 20 and a combination hydrostatic and hydrodynamic force at another portion of the seal face is that the mechanical seal is capable of operating at relatively low shaft speeds without promoting seal face wear. Further, the addition of the purely hydrostatic portion of the seal face, preferably along one of the concentric seal faces, enables the seal to maintain a seal during barrier fluid loss. This advantage is realized because the mechanical seal employs a balancing arrangement that enables the primarily hydrostatic seal region to form a substantial fluid seal between the process and ambient environments.

Still another significant feature is that the mechanical seal is arranged such that an increase or decrease in barrier fluid pressure relative to the process fluid in the seal produces a corresponding net change in the opening force that separates the seal faces only along the hydrostatic portion of the seal. This pressure arrangement enables the system operator to adjust the opening force by varying the pressure differential between the barrier fluid and the process fluid. This pressure control feature allows substantially precise adjustment of the gap thickness during use.

Additionally, the mechanical seal 10 of the present invention allows for the adjustment of the degree of contact or the thickness of the gap formed between the seal faces, independent of shaft rotation speed, by adjusting the barrier fluid pressure, and thus the magnitude of the hydrostatic lifting force F1, to produce the desired separation gap. Accordingly, it is possible to cause complete or partial separation of the seal faces at start-up, i.e., when the shaft is not rotating by increasing the barrier fluid pressure. Likewise, complete or partial separation of the seal faces can also occur at low shaft speeds by increasing the barrier fluid pressure.

Still another advantage of the invention is that the secondary sealing structure prevents, minimizes or inhibits seal face hang-up or O-ring hysteresis. Consequently, the seal exhibits increased sealing properties since the separation of the seal faces is maintained within system limits.

One skilled in the art will recognize that the seal 10 of the present invention can be designed as a completely split mechanical seal in which a portion of each of the seal components, e.g. the gland assembly, the sleeve, the stationary and rotary seal rings, and the O-rings, is split. Such a split-seal design facilitates replacement or repair of damaged seal components by permitting installation and removal of the split seal components without necessitating the complete breakdown of the associated equipment, e.g., a pump or the like, and without having to pass the seal over the end of the shaft. Examples of suitable split seal designs are described in co-pending U.S. patent application Ser. No. 08/992,753, filed on Dec. 17, 1997, and entitled "Split Mechanical Face Seal", in co-pending U.S. patent application Ser. No. 08/992,751, filed on Dec. 17, 1997, and entitled "Split Mechanical Face Seal with Negative Pressure Control System", co-pending U.S. patent application Ser. No. 08/992,611, filed on Dec. 17, 1997, and entitled "Split Mechanical Face Seal With Fluid Introducing Structure" and co-pending U.S. patent application Ser. No. 08/992,613, filed on Dec. 17, 1997, and entitled "Split Mechanical Face Seal With Resilient Pivoting Member", all of which are incorporated herein by reference.

One skilled in the art will recognize that, although only a single seal configuration is described and illustrated herein, the seal 10 of the present invention can be used in a dual or tandem or plural seal configuration in which multiple seals 10 or seal rings are arranged axially along the shaft.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A device for sealing a fluid in a fluid housing having a shaft, comprising a first seal ring having a seal face, a second seal ring having a seal face and a back surface that includes a first axially outermost surface and a second axially inwardly stepped surface, said seal faces of said first and second seal rings being opposed to each to provide some degree of sealing therebetween when assembled, a compression plate having a front surface and a back surface, said front surface having a first radially extending surface and an axially stepped second generally radially extending surface, a resilient member coupled at one end to said back surface of said compression plate for axially biasing said second seal ring relative to said first seal ring, wherein one of said second axially inwardly stepped surface of said back surface of said second seal ring and said axially stepped second generally radially extending surface of said compression plate includes two or more transverse surfaces to form a contact region, and a secondary seal positioned between said second radially extending surface of said compression plate and said back surface of said second seal ring and directly contacting at least two of said transverse surfaces during operation, whereby said contact region formed by said transverse surfaces prevents significant compression of said secondary seal to avoid excessive frictional contact between the secondary seal and the device.

2. The device of claim 1, wherein said compression plate is disposed in generally parallel and axially opposed and spaced relation to said back surface of said second seal ring.

3. The device of claim 2, wherein said secondary seal maintains said axially spaced relationship between said compression plate and said back surface of said second seal ring.

4. The device of claim 1, wherein said first axially outermost surface and said second axially inwardly stepped surface are connected by an axially extending wall portion, said secondary seal being positioned between said wall portion, said second stepped surface of said second seal ring, and said stepped second radially extending surface of said compression plate.

5. The device of claim 1, wherein said stepped second radially extending surface includes said multiple transverse surfaces forming a multi-angled surface.

6. The device of claim 5, wherein said multi-angled surface comprises two surfaces that are arranged to form an obtuse angle therebetween.

7. The device of claim 1, wherein said secondary seal is disposed within a chamber sized larger than an outermost diameter of said secondary seal to avoid excessive squeeze of the secondary seal within the chamber, thereby reducing hysteresis.

8. The device of claim 1, wherein said device is free of a second resilient member or a second compression plate.

9. A device for sealing a fluid in a fluid housing having a shaft, comprising a first seal ring having a seal face, a second seal ring having a seal face and a back surface that includes a first axially outermost surface and a second axially inwardly stepped surface, said seal faces of said first and second seal rings being opposed to each to provide some degree of sealing therebetween when assembled, a compression plate having a front surface and a back surface, said front surface having a first radially extending surface and an axially stepped second generally radially extending surface, a resilient member coupled at one end to said back surface of said compression plate for axially biasing said second seal ring relative to said first seal ring, wherein said second axially inwardly stepped surface of said back surface of said second seal ring includes multiple transverse surfaces to form a contact region, and a secondary seal positioned between said second radially extending surface of said compression plate and said back surface of said second seal ring and directly contacting said multiple transverse surfaces during operation, whereby said contact region formed by said multiple transverse surfaces prevents significant compression of said secondary seal to avoid excessive frictional contact between the secondary seal and the device.

10. The device of claim 9, wherein said multi-angled surface comprises two surfaces that are arranged to form an obtuse angle therebetween.

11. The device of claim 10, further comprising a chamber sized larger than an outermost diameter of said secondary seal to avoid excessive squeeze of the secondary seal when mounted within the chamber, thereby reducing hysteresis.

12. The device of claim 9, wherein said device is free of a second resilient member or a second compression plate.

13. A secondary sealing assembly suitable for use with a mechanical seal adapted for sealing a fluid in a housing having a shaft, said mechanical seal having a first seal ring having a seal face and adapted to rotate with the shaft, and a second seal ring having a seal face and being restrained from rotating, said second seal ring having a back surface, said secondary sealing assembly comprising a resilient member mounted within a chamber formed within the mechanical seal for axially biasing said second seal ring relative to said first seal ring, a compression plate having a front surface and a back surface, said front surface having a first radially extending surface and an axially stepped second generally radially extending surface, said stepped second surface including two or more transverse surfaces, and a secondary seal positioned within the chamber between said compression plate front surface and said back surface of said second seal ring and directly contacting at least two of said transverse surfaces during operation, whereby said compression plate, said secondary seal, and the back surface of said secondary seal ring cooperate to avoid excessive frictional contact between the secondary seal and the mechanical seal.

14. A mechanical face seal for providing fluid sealing between a housing and a rotatable shaft, the seal comprising a first seal ring having a first seal face and a rear surface, a second seal ring having a second seal face, said first and second seal faces being opposed to each other when assembled, a gland assembly for coupling said first seal to said housing, the gland assembly having an inner surface, and a secondary sealing assembly for providing fluid sealing between said first seal ring and said gland assembly, said secondary sealing assembly comprising
 a compression member having a front surface and a rear surface,
 a resilient member positioned between said rear surface of said compression member and the inner surface of the gland assembly for axially biasing said compression member, and
 a sealing member interposed between said front surface of said compression member and said rear surface of said first seal ring,
one of said rear surface of said first seal ring and said front surface of said compression member having two or more angled surfaces, at least of two of said angled surfaces contacting the sealing member to impart an axial and a radial sealing force on said sealing member, said axially and radial sealing force placing said sealing member into sealing engagement with said first seal ring and said inner surface of the gland assembly to prevent fluid leakage between said first seal ring and said gland assembly.

15. The secondary sealing assembly of claim 14, wherein the front surface of compression member includes a first surface and a second surface, said first surface being oriented at angle to said second surface.

16. The secondary sealing assembly of claim 15, wherein said angle between said first surface and said second surface comprises an obtuse angle.

17. The secondary sealing assembly of claim 16, wherein said first surface extends radially and imparts a generally axial force on said sealing member.

18. The secondary sealing assembly of claim 17, wherein said second surface imparts a radial and an axial force on said sealing member.

19. The secondary sealing assembly according to claim 18, wherein said angle defined by said first and second surfaces is selected to minimize the radial force imparted on said sealing member and maintain said sealing member in sealing contact with said inner surface of said gland assembly.

20. A secondary sealing assembly for use with a mechanical face seal, the mechanical face seal including a first seal ring, a second seal ring, and a gland assembly, the first seal ring having a rear surface and the gland assembly having an inner surface, the secondary sealing assembly comprising
 a compression member having a front surface and a rear surface,
 a resilient member positioned between said rear surface of said compression member and the inner surface of the gland assembly for axially biasing said compression member, and
 a sealing member interposed between said front surface of said compression member and said rear surface of said first seal ring,
 said front surface of said compression member having two or more angled surfaces, at least two of said angled surfaces contacting said sealing member to impart an axial and a radial sealing force on said sealing member, said axially and radial sealing force placing said sealing member into sealing engagement with the first seal ring and the inner surface of the gland assembly to prevent fluid leakage between the first seal ring and the gland assembly.

21. A mechanical face seal for providing fluid sealing between a housing and a rotatable shaft, the seal comprising
 a first seal ring having a first seal face and a rear surface,
 a second seal ring having a second seal face, said first and second seal faces being opposed to each other when assembled,
 a gland assembly for coupling said first seal to said housing, the gland assembly having an inner surface, and
 a secondary sealing assembly for providing fluid sealing between said first seal ring and said gland assembly, said secondary sealing assembly comprising
  a compression member having a front surface and a rear surface,
  a resilient member positioned between said rear surface of said compression member and the inner surface of the gland assembly for axially biasing said compression member, and
  a sealing member interposed between said front surface of said compression member and said rear surface of said first seal ring,
 said rear surface of said first seal ring and said front surface of said compression member forming a chamber for receiving said sealing member, said chamber and said secondary sealing assembly being sized to permit thermal expansion of said sealing member in the radial direction during operation of the seal.

22. The mechanical seal according to claim 21, wherein the size of said chamber is greater than the cross-sectional diameter of said sealing member prior to thermal expansion.

23. A mechanical face seal for providing fluid sealing between a housing and a rotatable shaft, the seal comprising
 a first seal ring having a first seal face and a rear surface,
 a second seal ring having a second seal face, said first and second seal faces being opposed to each other when assembled,
 a gland assembly for coupling said first seal to said housing, the gland assembly having an inner surface, and
 a secondary sealing assembly for providing fluid sealing between said first seal ring and said gland assembly, said secondary sealing assembly comprising
  a compression member having a front surface and a rear surface,
  a resilient member positioned between said rear surface of said compression member and the inner surface of the gland assembly for axially biasing said compression member, and
  a sealing member interposed between said front surface of said compression member and said rear surface of said first seal ring,
 said rear surface of said first seal ring and said front surface of said compression member having two or more angled surfaces, at least two of said angled surfaces contacting said sealing member, said angled surfaces being oriented to form in cooperation with the sealing member a substantially constant radially inward force on said sealing member independent of other structure.

\* \* \* \* \*